United States Patent
Hino

(10) Patent No.: US 7,825,904 B2
(45) Date of Patent: Nov. 2, 2010

(54) INFORMATION PROCESSING APPARATUS AND STORAGE MEDIUM STORING ITEM SELECTING PROGRAM

(75) Inventor: Takanori Hino, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 950 days.

(21) Appl. No.: 11/195,850

(22) Filed: Aug. 3, 2005

(65) Prior Publication Data
US 2006/0256091 A1    Nov. 16, 2006

(30) Foreign Application Priority Data
May 16, 2005    (JP)    ............... 2005-142858

(51) Int. Cl.
*G09G 5/00*    (2006.01)
(52) U.S. Cl. .............. 345/173; 345/156; 345/179; 178/18.01; 178/19.07; 463/36; 463/39
(58) Field of Classification Search ............. 345/156, 345/173–183; 178/18.01–19.07; 463/36–39
See application file for complete search history.

(56) References Cited

U.S. PATENT DOCUMENTS

| | | | | | |
|---|---|---|---|---|---|
| 5,252,951 | A | * | 10/1993 | Tannenbaum et al. | ....... 345/156 |
| 5,363,154 | A | * | 11/1994 | Galanter et al. | ............ 351/203 |
| 5,933,149 | A | * | 8/1999 | Mori et al. | ................... 345/442 |
| 6,518,957 | B1 | * | 2/2003 | Lehtinen et al. | ............. 345/173 |
| 6,535,204 | B2 | * | 3/2003 | Sun | ............................. 345/173 |
| 2004/0196255 | A1 | * | 10/2004 | Cheng | ........................ 345/104 |
| 2004/0246240 | A1 | * | 12/2004 | Kolmykov-Zotov et al. | . 345/179 |
| 2005/0041014 | A1 | * | 2/2005 | Slotznick | ..................... 345/156 |
| 2005/0057489 | A1 | * | 3/2005 | Kung et al. | ................... 345/156 |
| 2005/0099400 | A1 | * | 5/2005 | Lee | ............................. 345/173 |
| 2005/0270289 | A1 | * | 12/2005 | Momose | ..................... 345/443 |
| 2007/0198948 | A1 | * | 8/2007 | Toriyama | .................... 715/790 |

FOREIGN PATENT DOCUMENTS

| | | |
|---|---|---|
| JP | 06-180629 | 6/1994 |
| JP | 09-062446 | 3/1997 |
| JP | 10-028777 | 2/1998 |
| JP | 2004-343653 | 12/2004 |
| JP | 2005-092472 | 4/2005 |

* cited by examiner

*Primary Examiner*—Bipin Shalwala
*Assistant Examiner*—Afroza Y Chowdhury
(74) *Attorney, Agent, or Firm*—Nixon & Vanderhye P.C.

(57) ABSTRACT

An information processing apparatus includes a touch panel provided on a menu selection screen including a plurality of items, a direction key for instructing a moving direction of a cursor, and an execution key for instructing execution of a process corresponding to a selecting item. The display of the cursor can be moved according to a position instructed by the touch panel as well as the direction key. A process corresponding to a selected item is executed by a touch-off as well as by an operation of the execution key. It is noted that in a case that a touch input is continued for equal to or more than a predetermined time period after the touch-on, in a case that a touch input is present until the touch-off in an area except for the area corresponding to the item pointed at a start of touch, or in a case that a touch input is present until the touch-off in an area at a predetermined distance away from the position instructed at a start of touch, the process corresponding to the selected item is not executed.

12 Claims, 12 Drawing Sheets

(A)

(B)

(A)

(B)

MOVE TO AREA EXCEPT FOR ITEM AT A START OF TOUCH

TOUCH-OFF

NO EXECUTION PROCESS CORRESPONDING TO SELECTED ITEM

INFORMATION PROCESSING APPARATUS AND STORAGE MEDIUM STORING ITEM SELECTING PROGRAM

This application claims priority to JP 2005-142858 filed 16 May 2005, the entire content of which is hereby incorporated by reference.

BACKGROUND OF THE INVENTION

1. Field of the Invention

The present invention relates to an information processing apparatus and a storage medium storing an item selection processing program. More specifically, the present invention relates to an information processing apparatus that is provided with a display on which a menu screen including a plurality of items is displayed, a pointing device such as a touch panel provided on a screen, a direction instructing key and an execution instructing key, and a storage medium storing an item selection processing program thereof.

2. Description of the Prior Art

One example of a technique for selecting a menu item displayed on a display on which a touch panel is placed is disclosed in a document 1 (Japanese Patent Laying-open No. 10-28777). In the document 1, when a user depresses with his finger an item displayed on the display provided with a touch sensor (touch panel), a screen corresponding to this item is displayed on the display (paragraph 0027, FIG. 5).

On the other hand, in an information processing apparatus provided with a direction key for instructing a moving direction (cross key, arrow key, etc.) and an execution key for instructing execution (A button, enter key, etc.) such as a game apparatus, a personal computer, etc., in general, a cursor for indicating an input position and a selecting state is displayed in association with a menu item. Then, an item is selected according to a movement of the cursor by operating the direction key, and an operation or process corresponding to the selected item is executed by operating the execution key.

However, in the document 1, when the menu item is directly touched, the process corresponding to the item is executed, but it is not clear about movement of the cursor according to an operation of the touch panel. In a case that instructing the menu item is made only with a touch panel operation like the document 1, it is convenient for the user who becomes accustomed to the touch panel operation, but it is difficult for the user who was accustomed to a conventional key operation to enrich his or her experience in the touch panel operation because it is impossible for the touch panel operation to perform an operation for displaying and moving the cursor, that is, an operation for simply selecting and moving the cursor without executing an item, thus causing a problem of operability.

SUMMARY OF THE INVENTION

Therefore, a novel information processing apparatus and storage medium storing an item selection processing program has been invented.

Disclosed herein are an information processing apparatus and a storage medium storing an item selection processing program capable of improving operability when instructing an item selection and an operation corresponding to the selected item like a conventional key operation.

An information processing apparatus of a first embodiment according to the present invention is an information processing apparatus provided with a display for displaying a screen including a plurality of items, a direction key for changing a selecting item out of the plurality of items, a specifying means for specifying a selecting item by the direction key, an execution key for instructing execution of a process corresponding to the item specified by the specifying means, and an executing means for executing the process corresponding to the item specified by the specifying means when the execution key is operated. The information processing apparatus further comprises a pointing device, an input detecting means, a measuring means, a first condition determining means, a coordinates detecting means, and a storing means. The pointing device is for pointing a position on the screen. The input detecting means detects presence or absence of an input by the pointing device. The measuring means measures a time continued in an input-present-state detected by the input detecting means. The first condition determining means determines whether or not the time measured by the measuring means is above a threshold value. The coordinates detecting means detects coordinates of the position input by the pointing device. The storing means stores item position data indicative of position coordinates corresponding to each of the plurality of items. The specifying means specifies and changes the selecting item by specifying the item corresponding to the coordinates detected by the coordinates detecting means on the basis of the item position data. The executing means, when it is detected that the input-present-state is shifted to an input-absent-state by the input detecting means, does not execute a process corresponding to the selecting item specified by the specifying means in a case that it is determined that the time is above the threshold value by the first condition determining means, and executes the process corresponding to the selecting item specified by the specifying means in a case that it is determined that the time is not above the threshold value by the first condition determining means.

More specifically, the information processing apparatus (10: a reference numeral corresponding in the embodiment described later and so forth) is provided with the display (12, 14) for displaying the screen including the plurality of items (70). The information processing apparatus is for executing the process corresponding to the item selected by a user out of the plurality of items displayed on the menu screen, and further comprises the direction key (20a) and execution key (20d). The direction key is for changing the selecting item, and the specifying means (42, S39) specifies the selecting item by the direction key. The execution key is for instructing execution of the process corresponding to the specified selecting item, and the executing means (42, 92, S47) executes the process corresponding to the item specified in response to the operation of the execution key. The information processing apparatus thus capable of executing the menu item selecting process by the direction key and the execution key further comprises the pointing device (22) for pointing a position on the screen. The pointing device includes a touch panel mounted on the screen of the display in the embodiment. The input detecting means (42, 54, 88, S3, S5) detects the presence or absence of the input by the pointing device. As to the touch panel, it is detected whether it is in a touch-on state or a touch-off state. The measuring means (42, 114, S17) measures a time period continued in the input-present-state by the pointing device. The first condition determining means (42, 94, S21) determines whether or not the measured input continued time is above the threshold value. The coordinates detecting means (42, 88, S7) detects the coordinates of the position input by the pointing device. The storing means (28a, 48) stores the item position data (100) indicative of the position coordinates corresponding to each of the plurality of items. Furthermore, the specifying means (42, S11) specifies the item corresponding to the detected coordinates on the basis of the item position data, and specifies it as the selecting item, and changes the selecting item. The executing means (42, 92, S25, S29, S31), when it is detected that the input-present-state is shifted to the input-absent-state, does not execute the process corresponding to the selecting item in a case that it is determined that the input continued time is above the threshold value, and executes the process corresponding to the selecting item in a case that it is determined that the input continued time is not above the threshold value.

Accordingly, when the input-absent-state is made after the input continued time by the pointing device elapses for equal to or more than the predetermined time period, the process corresponding to selecting item is not executed, and only the item selection as to the pointing position is executed. On the other hand, when the input-absent-state is made before the input continued time by the pointing device elapses for equal to or more than the predetermined time period, the process corresponding to the selecting item is activated. Thus, utilizing either the direction key and the execution key, or the pointing device allows the user to instruct item selection and execution of the process corresponding to the selecting item, capable of improving operability in selecting the menu items.

In one aspect, a specified-item-representing-image display controlling means for displaying an image representing the item being specified by the specifying means is further provided.

Accordingly, the specified-item-representing-image display controlling means (42, 50, 52, 60, 86, S13, S41, S87) displays the image (72) representing the selecting item, allowing the user to clearly know which is the selecting item.

In one embodiment, the executing means, when it is detected that the input-present-state is shifted to the input-absent-state by the input detecting means, and the coordinates detected at a time of detecting that state by the coordinates detecting means indicate the position corresponding to the item based on the item position data, does not execute the process corresponding to the selecting item specified by the specifying means in a case that it is determined that the time is above the threshold value by the first condition determining means, and executes the process corresponding to the selecting item specified by the specifying means in a case that it is determined that the time is not above the threshold value by the first condition determining means.

More specifically, the executing means (S27) performs the process on the basis of the premise that it is detected that the input-present-state is shifted to the input-absent-state, and the coordinates detected at the time of detection of that state indicate the position corresponding to the item based on the item position data. That is, when the input-present-state is shifted to the input-absent-state in a state the position corresponding to the item is pointed, where the condition of the input continued time is satisfied, the process corresponding to the selecting item is executed. Accordingly, an execution instructing operation at a position corresponding to the item (touch-off operation on the item display area, for example) is required, allowing the user to intuitively and easily instruct execution of the selected item.

A storage medium storing an item selection processing program of a second embodiment according to the present invention is a storage medium storing an item selection processing program of an information processing apparatus provided with a display for displaying a screen including a plurality of items, a direction key for changing a selecting item out of the plurality of items, an execution key for instructing execution of a process corresponding to the selecting item by the direction key, a pointing device for pointing a position on the screen, and a storing means for storing item position data indicating position coordinates corresponding to each of the plurality of items. The program stored in this storage medium causes a processor of the information processing apparatus to execute a specifying step, an executing step, an input detecting step, a measuring step, a first condition determining step, and a coordinates detecting step. The specifying step specifies the selecting item by the direction key. The executing step executes a processor corresponding to the item specified by the specifying step when the execution key is operated. The input detecting step detects presence or absence of an input by the pointing device. The measuring step measures a time continued in an input-present-state detected by the input detecting step. The first condition determining step determines whether or not the time measured by the measuring step is above a threshold value. The coordinates detecting step detects the coordinates of the position input by the pointing device. The specifying step specifies and changes the selecting item by specifying the item corresponding to the coordinates detected by the coordinates detecting step on the basis of the item position data. The executing step, when it is detected that the input-present-state is shifted to the input-absent-state by the input detecting step, does not execute the process corresponding to the selecting item specified by the specifying step in a case that it is determined that the time is above the threshold value by the first condition determining step, and executes the process corresponding to the selecting item specified by the specifying step in a case that it is determined that the time is not above the threshold value by the first condition determining means.

The second embodiment is a storage medium storing the item selection processing program corresponding to the above-described the information processing apparatus of the first embodiment, and can improve operability in a similar manner to the above-described information processing apparatus.

An information processing apparatus of a third embodiment according to the present invention is an information processing apparatus provided with a display for displaying a screen including a plurality of items, a direction key for changing a selecting item out of the plurality of items, a specifying means for specifying a selecting item by the direction key, an execution key for instructing execution of a process corresponding to the item specified by the specifying means, and an executing means for executing the process corresponding to the item specified by the specifying means when the execution key is operated. The information processing apparatus further comprises a pointing device, an input detecting means, a start determining means, a coordinates detecting means, a storing means, and a second condition determining means. The pointing device is for pointing a position on the screen. The input detecting means detects presence or absence of an input by the pointing device. The start determining means determines whether or not an input detected by the input detecting means is shifted from the input-present-state to the input-absent-state. The coordinates detecting means detects coordinates of the position input by the pointing device. The storing means stores item position data indicative of position coordinates corresponding to each of the plurality of items. The second condition determining means determines whether or not the coordinates detected by the coordinates detecting means after it is determined that the input-absent-state is shifted to the input-present-state by the start determining means continues to be in the position of the item specified on the basis of the item position data in correspondence to the coordinates detected by the coordinates detecting means when it is determined that the input-absentstate is shifted to the input-present-state by the start determining means. The specifying means specifies and changes the selecting item by specifying the item corresponding to the coordinates detected by the coordinates detecting means on the basis of the item position data. The executing means, when it is detected that the input-present-state is shifted to the input-absent-state by the input detecting means, does not execute a process corresponding to the selecting item specified by the specifying means in a case that it is determined that being in the position of the item is not continued by the second condition determining means, and executes the process corresponding to the selecting item specified by the specifying means in a case that it is determined that being in the position of the item is continued by the second condition determining means.

More specifically, as a condition for allowing execution of the process corresponding to selecting item, a condition different from the above-described information processing apparatus of the first invention is set. That is, in the first embodiment, the input continued time is determined, but in the third embodiment, it is determined whether or not the item corresponding to a position pointed at a start of input (in performing a touch-on) is continued to be instructed as the condition. It is noted that a description is made on a difference as to setting of the condition, and a part the same as the above-described first invention will be omitted. The start determining means (42, S81) determines whether or not the input detected by the input detecting means is shifted from the presence of input to the absence of input. The second condition determining means (42, 94, S89, S93) determines whether or not the coordinates detected after it is determined that the input-absent-state is shifted to the input-present-state continues to be the position corresponding to the item corresponding to the position pointed at a start of input. That is, it is determined whether or not an input instruction as to the item pointed at a start of the input is continued from the start of the input to the end of the input. The executing means (42, 92, S25, S29, S31), when it is detected that the input-absent-state is shifted from the input-present-state, does not execute a process corresponding to the selecting item in a case that it is determined that the coordinates do not continue to be in the position corresponding to the item instructed at a start of input, and executes the process corresponding to the selecting item in a case that it is determined that the coordinates continue to be in the position corresponding to the item instructed at a start of input. Accordingly, when a position except for the item selected at a start of input by the pointing device is instructed to make the input-absent-state, the process corresponding to the selected item is not executed, and an item selection corresponding to the pointing position is merely executed. On the other hand, when a position or area corresponding to the item selected at a start of input by the pointing device is continued to be instructed to make the input-absent-state, the process corresponding to the selected item is activated. Thus, utilizing either the direction key and the execution key or the pointing device allows the user to instruct the item selection and execution of the process corresponding to the selecting item, capable of improving operability in selecting the menu items.

In one aspect, a specified-item-representing-image display controlling means for displaying an image representing a selecting item specified by the specifying means is further provided.

In addition, in one embodiment, the executing means, when it is detected that the input-present-state is shifted to the input-absent-state by the input detecting means, and the coordinates detected at a time of detecting that state by the coordinates detecting means indicates the position corresponding to the item based on the item position data, does not execute the process corresponding to the selecting item specified by the specifying means in a case that it is determined that being in the position of the item is not continued by the second condition determining means, and executes the process corresponding to the selecting item specified by the specifying means in a case that it is determined that being in the position of the item is continued by the second condition determining means. It is noted that the detection whether or not the coordinates immediately before the input is shifted to the input-absent state indicates the position corresponding to the item based on the item position data is performed in the step S9 and S93 in the embodiment.

The third invention also has an advantage the same as the above-described first invention.

A storage medium storing an item selection processing program of a fourth invention according to the present invention is a storage medium storing an item selection processing program of an information processing apparatus provided with a display for displaying a screen including a plurality of items, a direction key for changing a selecting item out of the plurality of items, an execution key for instructing execution of a process corresponding to the selecting item by the direction key, a pointing device for pointing a position on the screen, and a storing means for storing item position data indicating position coordinates corresponding to each of the plurality of items. The program stored in the storage medium causes the processor of the information processing apparatus to execute a specifying step, an executing step, an input detecting step, a start determining step, a coordinates detecting step, and the second condition determining step. The specifying step specifies the selecting item by the direction key. The executing step executes a process corresponding to the item specified by the specifying step when the execution key is operated. The input detecting step detects presence or absence of an input by the pointing device. The start determining step determines whether or not an input detected by the input detecting means is shifted from the input-absent-state to the input-present-state. The coordinates detecting step detects coordinates of the position input by the pointing device. The second condition determining step determines whether or not the coordinates detected by the coordinates detecting step after it is determined that the input-absent-state is shifted to the input-present-state by the start determining step continues to be in the position of the item specified on the basis of the item position data in correspondence to the coordinates detected by the coordinates detecting step when it is determined that the input-absent-state is shifted to the input-present-state by the start determining step. The specifying step specifies and changes the selecting item by specifying the item corresponding to the coordinates detected by the coordinates detecting step on the basis of the item position data. The executing step, when it is detected that the input-present-state is shifted to the input-absent-state by the input detecting step, does not execute a process corresponding to the selecting item specified by the specifying step in a case that it is determined that being in the position of the item is not continued by the second condition determining step, and executes the process corresponding to the selecting item specified by the specifying step in a case that it is determined that being in the position of the item is continued by the second condition determining step.

The fourth invention is the storage medium storing an item selection processing program corresponding to the above-described information processing apparatus of the second invention, and can improve operability similar to the above-described information processing apparatus.

An information processing apparatus of a fifth invention according to the present invention is an information processing apparatus provided with a display for displaying a screen including a plurality of items, a direction key for changing a selecting item out of the plurality of items, a specifying means for specifying a selecting item by the direction key, an execution key for instructing execution of a process corresponding to the item specified by the specifying means, and an executing means for executing the process corresponding to the item specified by the specifying means when the execution key is operated. The information processing apparatus further comprises a pointing device, an input detecting means, a start determining means, a coordinates detecting means, a storing means, and a third condition determining means. The pointing device is for pointing a position on the screen. The input detecting means detects presence or absence of an input by the pointing device. The start determining means determines whether or not an input detected by the input detecting means is shifted from the input-absent-state to the input-present-state. The coordinates detecting means detects coordinates of the position input by the pointing device. The storing means stores item position data indicative of position coordinates corresponding to each of the plurality of items. The third condition determining means determines whether or not the coordinates detected by the coordinates detecting means after it is determined that the input-absent-state is shifted to the input-present-state by the start determining means continues to be within a predetermined distance from the coordinates detected by the coordinates detecting means when it is determined that the input-absent-state is shifted to the input-present-state by the start determining means. The specifying means specifies and changes the selecting item by specifying the item corresponding to the coordinates detected by the coordinates detecting means on the basis of the item position data. The executing means, when it is detected that the input-present-state is shifted to the input-absent-state by the input detecting means, does not execute the process corresponding to the selecting item specified by the specifying means in a case that it is determined that being within the predetermined distance is not continued by the third condition determining means, and executes the process corresponding to the selecting item specified by the specifying means in a case that it is determined that being within the predetermined distance is continued by the third condition determining means.

More specifically, as a condition for allowing execution of the process corresponding to selecting item, a condition different from the above-described information processing apparatus of the third invention is set. That is, in the third invention, it is determined whether or not the item corresponding to a position pointed at a start of input is continued to be instructed, but in the fifth embodiment, it is determined whether or not a position within the predetermined distance from the position pointed at a start of input is continued to be instructed. It is noted that a description is made on a difference as to the setting of the condition, and a part the same as the above-described third invention will be omitted. The third condition determining means (42, 94, S89) determines whether or not the coordinates detected after it is determined that the input-absent-state is shifted to the input-present-state continues to be within a predetermined distance from the coordinates pointed at a start of input. That is, it is determined whether or not the distance between the coordinates pointed at a start of input and the coordinates input thereafter continues to be within the predetermined distance. The executing means (42, 92, S25, S29, S31), when it is detected that the input-present-state is shifted to the input-absent-state, does not execute the process corresponding to the selecting item in a case that it is determined that being instructed within the predetermined distance from the coordinates instructed at a start of input is not continued, and executes the process corresponding to the selecting item in a case that it is determined that being instructed within the predetermined distance from the coordinates instructed at a start of input is continued. Accordingly, when a position except for an area within the predetermined distance from the position instructed at a start of the input by the pointing device is instructed to make the input-absent-state, the process corresponding to the selected item is not executed, and an item selection corresponding to the instructed position is only executed. On the other hand, when a position within the predetermined distance from the position instructed at a start of input by the pointing device continues to be instructed to make the input-absent-state, the process corresponding to the selected item is activated. Thus, utilizing the direction key and the execution key or the pointing device allows the user to instruct the item selection and execution of the process corresponding to the selecting item, capable of improving operability in selecting the menu items.

In one aspect, a specified-item-representing-image display controlling means for displaying an image representing a selecting item specified by the specifying means is further provided.

In addition, in one embodiment, the executing means, when it is detected that the input-present-state is shifted to the input-absent-state by the input detecting means, and the coordinates detected at a time of detecting that state by the coordinates detecting means indicates the position corresponding to the item based on the item position data, does not execute the process corresponding to the selecting item specified by the specifying means in a case that it is determined that being within the predetermined distance is not continued by the third condition determining means, and executes the process corresponding to the selecting item specified by the specifying means in a case that it is determined that being within the predetermined distance is continued by the third condition determining means.

The fifth invention also has an advantage the same as the above-described first and the third invention.

A storage medium storing an item selection processing program of a sixth invention according to the present invention is a storage medium storing an item selection processing program of an information processing apparatus provided with a display for displaying a screen including a plurality of items, a direction key for changing a selecting item out of the plurality of items, an execution key for instructing execution of a process corresponding to the selecting item by the direction key, a pointing device for pointing a position on the screen, and a storing means for storing item position data indicating position coordinates corresponding to each of the plurality of items. The program stored in the storage medium causes a processor of the information processing apparatus to execute a specifying step, an executing step, an input detecting step, a start determining step, a coordinates detecting step, and a third condition determining step. The specifying step specifies the selecting item by the direction key. The executing step executes a process corresponding to the item specified by the specifying step when the execution key is operated. The input detecting step detects presence or absence of an input by the pointing device. The start determining step determines whether or not an input detected by the input detecting means is shifted from the input-absent-state to the input-present-state. The coordinates detecting step detects the coordinates of the position input by the pointing device.

The third condition determining step determines whether or not the coordinates detected by the coordinates detecting step after it is determined that the input-absent-state is shifted to the input-present-state by the start determining means continues to be within a predetermined distance from the coordinates detected by the coordinates detecting step when it is determined that the input-absent-state is shifted to the input-present-state by the start determining step. The specifying step specifies and changes the selecting item by specifying the item corresponding to the coordinates detected by the coordinates detecting step on the basis of the item position data. The executing step, when it is detected that the input-present-state is shifted to the input-absent-state by the input detecting step, does not execute a process corresponding to the selecting item specified by the specifying step in a case that it is determined that being within the predetermined distance is not continued by the third condition determining step, and executes the process corresponding to the selecting item specified by the specifying step in a case that it is determined that being within the predetermined distance is continued by the third condition determining step.

The sixth invention is a storage medium storing an item selection processing program corresponding to the above-described information processing apparatus of the fifth invention, and can improve operability similar to the above-described information processing apparatus.

According to the present invention, by both of the operation with the direction key and the execution key and the operation with the pointing device, it is possible to execute the item selection and the process corresponding to the selected item. Accordingly, the user can use the both operations at his own discretion, which improves operability in instructing the item selection and the execution of the process corresponding to the selected item.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view for explaining a process in a case of making a touch-off operation after a predetermined time elapses from a touch-on;

DETAILED DESCRIPTION OF THE PREFERRED EMBODIMENTS

Figure 1:
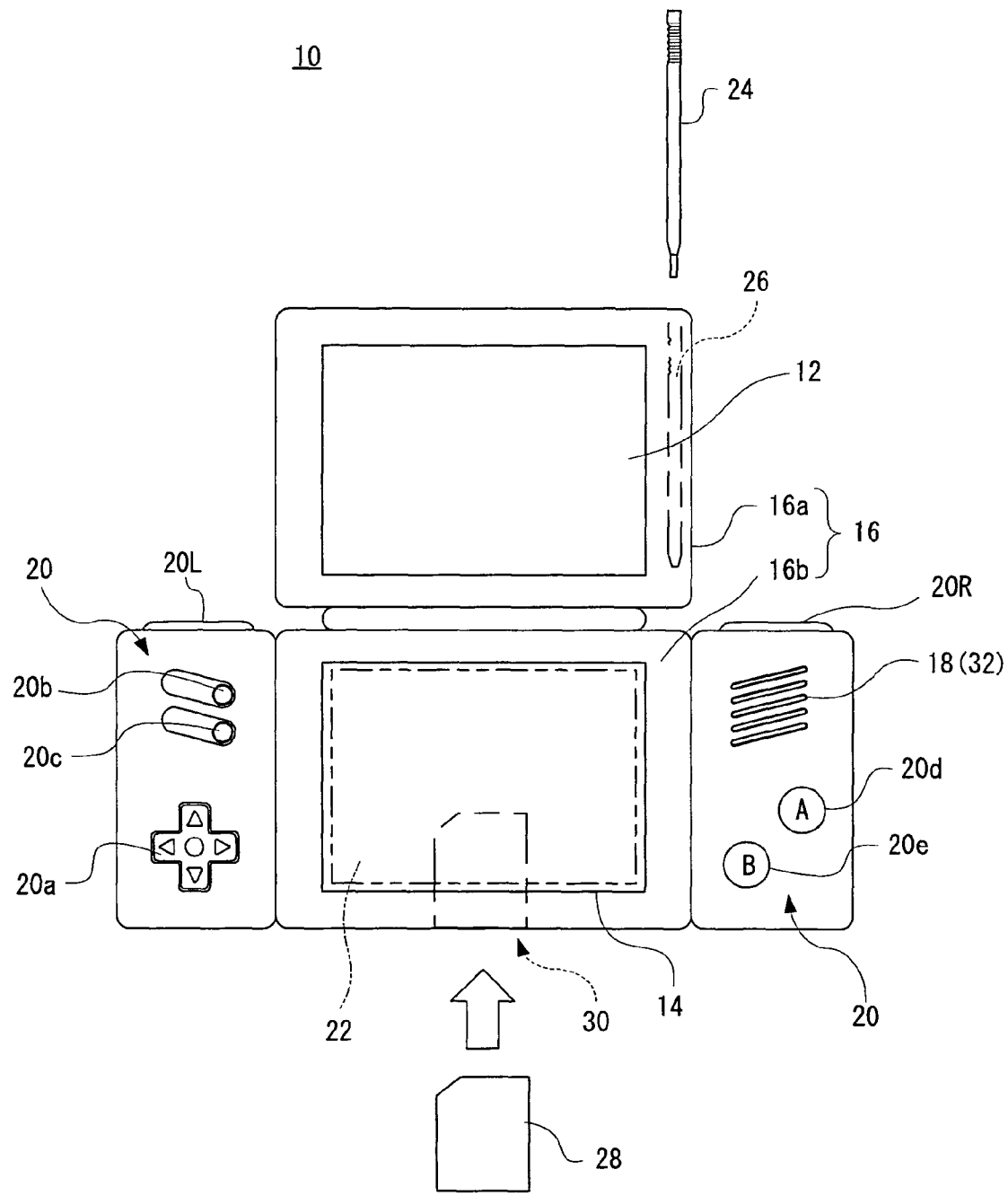
FIG. 1 is an appearance view showing one example of an information processing apparatus of one embodiment of the present invention.

Referring to FIG. 1, an information processing apparatus 10 of one embodiment of the present invention is embodied as a form of game apparatus. The game apparatus 10 includes a first liquid crystal display (LCD) 12 and a second LCD 14. The LCD 12 and the LCD 14 are provided on a housing 16 so as to be arranged in a predetermined position. In this embodiment, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound release hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to fold such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch or operation key 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by a player (user), instructing a moving direction of a cursor, and so forth by operating at least any one of four depression portions. That is, in this embodiment, the direction instructing switch 20a is a direction key for instructing a moving direction of the cursor.

It is noted that the information processing apparatus 10 relating to this invention is embodied as a game apparatus in this embodiment, the information processing apparatus 10 may consist of a personal computer provided with a keyboard, for example. In this case, four direction keys of the keyboard (may be referred to as a cursor key or an arrow key) correspond to the direction instructing switch 20a.

The start switch 20b is formed by a push button, and is utilized for starting (restarting), temporarily stopping (pausing) a game, and so forth. The select switch 20c is formed by the push button, and utilized for a game mode selection, etc.

The action switch 20d, that is, the A button 20d is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. Furthermore, at a time of a menu selection, a menu item on which a cursor is put, that is, the menu item that is in a selected state is determined, allowing execution of the operation or process corresponding to the item. That is, in this embodiment, the action switch 20d is an execution key for instructing execution of a process corresponding to a selected item.

It is noted that in a case that the information processing apparatus 10 consists of a personal computer as described above, an execution key (enter key or return key), for example, of a keyboard corresponds to the action switch 20d.

The action switch 20e, that is, the B button 20e is formed by the push button, and is utilized for changing a game mode selected by the select switch 20c, canceling an action determined by the A button 20d, and so forth.

The action switch 20L (L button) and the action switch 20R (R button) are formed by the push button, and the L button 20L and the R button 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of a resistance film system, an optical system (infrared rays system) and an electrostatic capacitive coupling system, for example, can be utilized. When being operated by depressing, stroking, touching, beating, and so forth with a stick 24, a pen (stylus pen), or a finger (hereinafter, referred to as "stick 24, etc.") on a top surface thereof, the touch panel 22 detects coordinates of the position pointed (being subjected to a touch input) by the stick 24, etc., and outputs coordinates data corresponding to the detected coordinates.

It is noted that in this embodiment, a resolution of the display surface of the LCD 14 is 256 dots×192 dots (this is true or roughly true for the LCD 12), and a detection accuracy of a detection surface (operation surface) of the touch panel 22 is also rendered 256 dots×192 dots in correspondence to the resolution of the display surface. It is noted that although the touch panel 22 is shown so as to be different from the LCD 14 in size for simplicity in FIG. 1, the display screen of the LCD 14 is the same as the operation surface of the touch panel 22 in size. It is noted that detection accuracy of the touch panel 22 may be lower than the resolution of the display surface, or higher than it.

Display screens like different game screens, may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD12 in this embodiment), and a game screen (operation screen) including an image such as textual information, an icon, etc. for operating the game may be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point a character image such as a player character, an enemy character, an item character, texture information, an icon, etc. to be displayed on the LCD 14 and select commands by operating the touch panel 22 with the use of the stick 24, etc.

It is noted that depending on the kind of the game, the player is able to use the LCD 14 for another various input instructions, such as selecting or operating the icon displayed on the LCD 14, instructing a coordinates input, and so forth.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (LCD 12, 14) and the operating portions (20, 22).

Furthermore, in this embodiment, the stick 24 can be inserted into a housing portion (housing slot) 26 provided in proximity to a side surface (right side surface) of the upper housing 16a, for example, and taken out therefrom as necessary. It is noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound release hole 18 inside the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
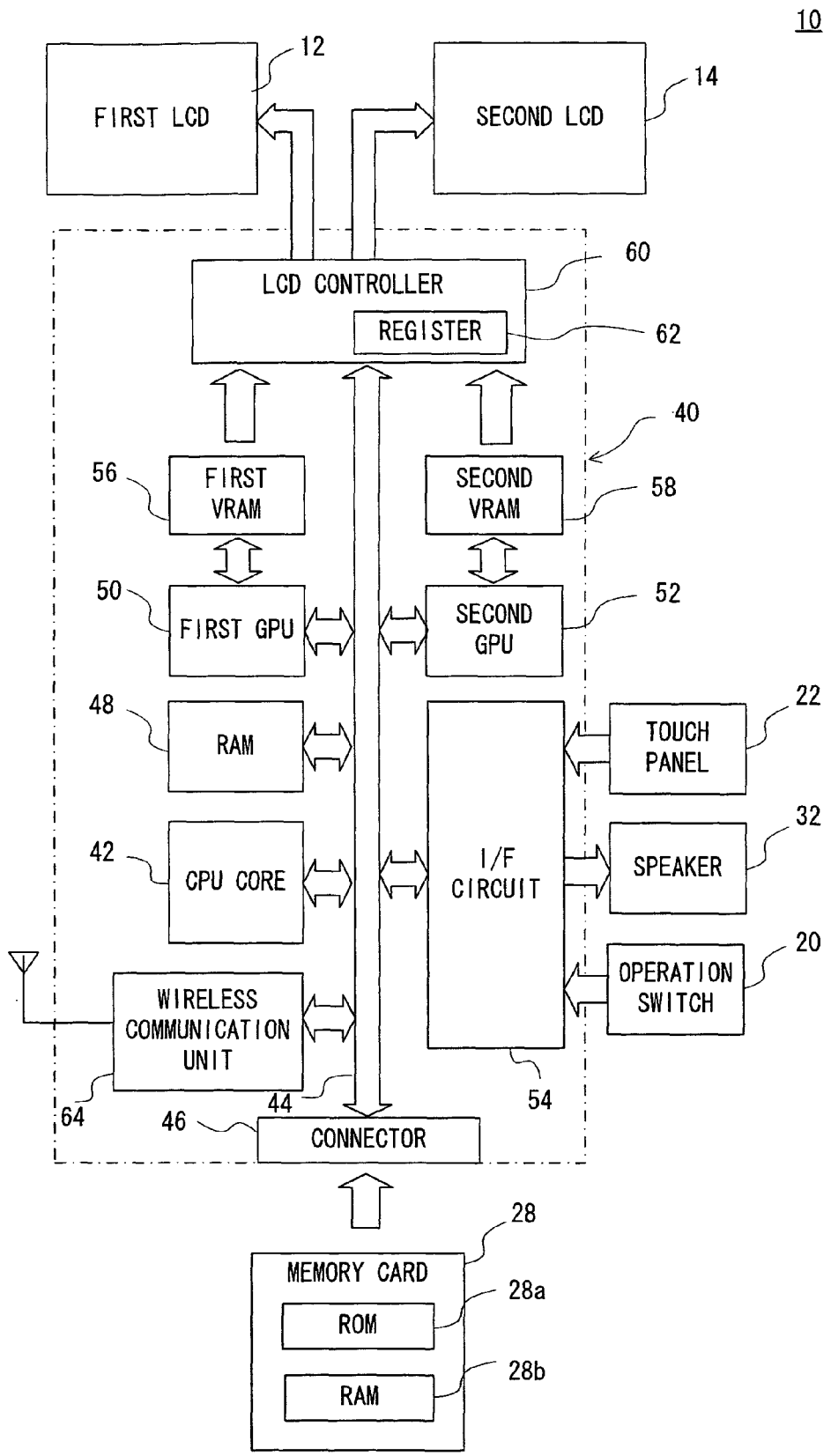
FIG. 2 is a block diagram showing an electrical configuration of the information processing apparatus of FIG. 1 embodiment.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, an LCD controller 60, a wireless communication unit 64.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, background image, item image, icon (button) image, message image, cursor image etc.), data of the sound (music) necessary for the game (sound data), etc. An item selection processing program according to this invention is stored in the ROM 28a in advance in this embodiment. The RAM (backup RAM) 28b stores (saves) proceeding data and result data of the game.

Furthermore, in a case that an application except for the game is executed, a program as to the application, image data required to execute the application, etc. are stored in the ROM 28a of the memory card 28. In addition, sound (music) data may be stored therein as necessary.

The RAM 48 is utilized as a buffer memory or a working memory. That is, the CPU core 42 loads the game program, the image data, the sound data, etc. stored in the ROM 28a of the memory card 28 into the RAM 48, and executes a process according to the loaded game program. The CPU core 42 executes a game process while storing in the RAM 48 data (game data, flag data, etc.) temporarily generated in correspondence with a progress of the game.

It is noted that the program, the image data, the sound data, etc. are loaded from the ROM 28a entirely at a time, or partially and sequentially as necessary so as to be stored (loaded) into the RAM 48.

Each of the GPU 50 and the GPU 52 forms a part of a rendering means, is constructed by, for example, a single chip ASIC, and receives a graphics command (construction command) from the CPU core 42 to generate game image data according to the graphics command. It is noted that the CPU core 42 applies to each of the GPU 50 and the GPU 52 an image generating program (included in the game program) required to generate the game image data in addition to the graphics command.

Furthermore, the GPU 50 is connected with a first video RAM (hereinafter, referred to as "VRAM") 56, and the GPU 52 is connected with a second VRAM 58. The GPU 50 and the GPU 52 gains access to the first VRAM 56 and the second VRAM 58 to fetch data (image data: data such as character data, texture, etc.) required to execute the construction command. It is noted that the CPU core 42 reads the image data necessary for rendering from the RAM 48, and writes it to the first VRAM 56 and the second VRAM 58 through the GPU 50 and the GPU 52. The GPU 50 accesses the VRAM 56 to create the game image data for display, and stores the image data in a rendering buffer of the VRAM 56. The GPU 52 accesses the VRAM 58 to create the game image data for rendering, and stores the image data in a rendering buffer of the VRAM 58. The rendering buffer includes a frame buffer, a line buffer, or the like.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data created by the GPU 50 to the LCD 12, and outputs the game image data rendered by the GPU 52 to the LCD 14 in a case that the data value of the register 62 is "0". On the other hand, the LCD controller 60 outputs the game image data created by the GPU 50 to the LCD 14, and outputs the game image data rendered by the GPU 52 to the LCD 12 in a case that the data value of the register 62 is "1".

It is noted that the LCD controller 60 can directly read the image data from the VRAM 56 and the VRAM 58, or read the image data from the VRAM 56 and the VRAM 58 via the GPU 50 and the GPU 52. In addition, the VRAM 56 and the VRAM 58 may be provided on the RAM 48, or the rendering buffer and a Z buffer may be provided in the RAM 48.

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, operation data (coordinates position data) from the touch panel 22 is input to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs it from the speaker 32 via the I/F circuit 54.

A wireless communication unit 64 is a communication means for sending and receiving data with other game apparatuses 10 by a short range radio, for example. That is, the wireless communication unit 64 modulates communication data to an opponent party into a radio signal to send it from an antenna, and receives a radio signal from a game apparatus 10 of the opponent party by the same antenna to demodulate it to communication data.

Figure 3:
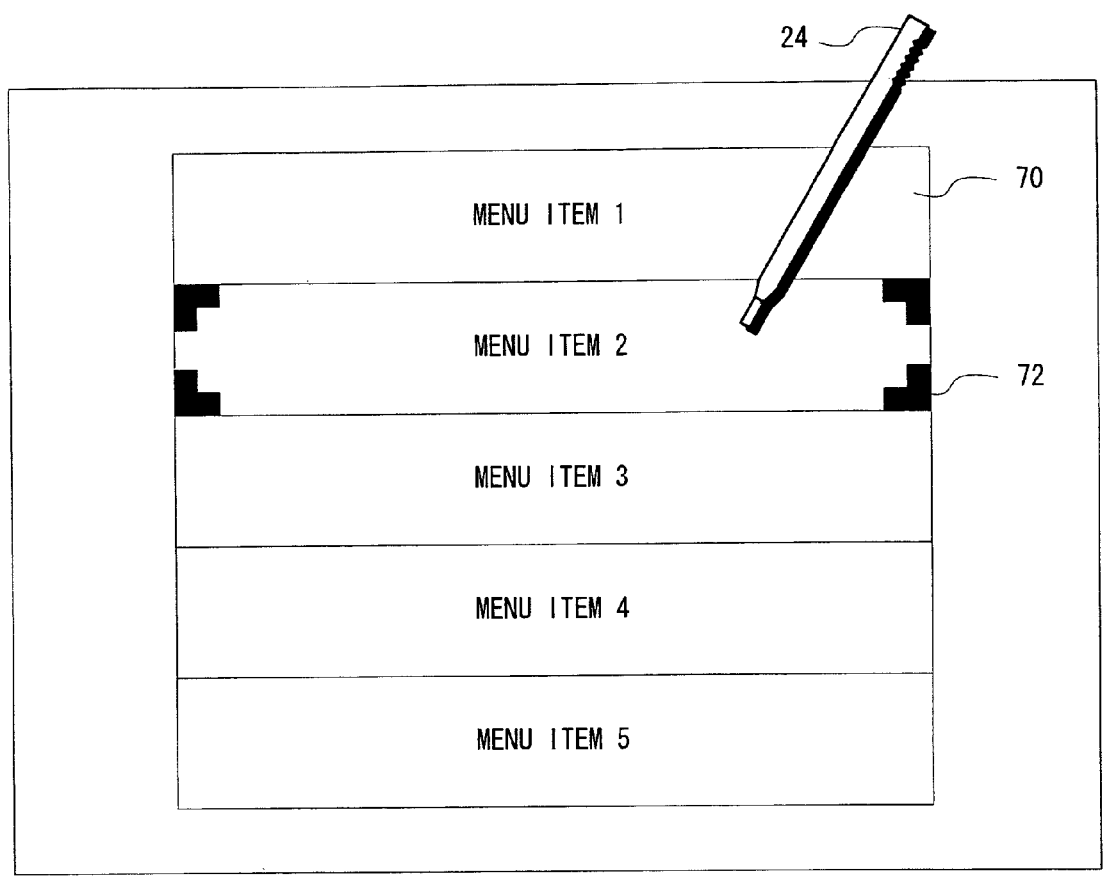
FIG. 3 is an illustrative view showing one example of a display screen in a case that an item is selected by a touch-on operation.

In the information processing apparatus 10, a menu screen is displayed on the LCD 14 on which the touch panel 22 is placed as shown in FIG. 3. The menu screen includes a plurality of items 70 to be selected, and the plurality of items 70 are arranged in a predetermined shape (one column in a vertical direction in FIG. 3). On the menu screen, a cursor 72 is displayed in relation to the item 70 which is in a state of being selected. In FIG. 3, the cursor 72 is displayed so as to be superposed on the item 70. In an initial state, the cursor 72 is displayed, in association with the predetermined item 70, on an item 70 arranged at the uppermost line, for example. The display of the cursor 72 allows the user to be clearly informed which is a selecting item. It is noted that the cursor 72 may simply be a mark (sign, symbol, etc.) representing that the item is being selected. Thus, in another embodiment, the cursor or mark 72 may be displayed as an item image changed in color, or may be displayed not on the item 70, but adjacent thereto.

On the menu screen, an operation of selecting a desired item 70, and executing it can be performed by utilizing both the operating switch 20 and the touch panel 22 in a similar manner.

That is, when being instructed by the direction key 20a, the cursor 72 is displayed so as to move to an instructed direction. In FIG. 3 example, the plurality of items 70 are vertically arranged, and therefore, the cursor 72 moves in response to an operation of up or down portion of the direction key 20a. Then, when the execution key 20d is operated, a process or operation corresponding to the selected item 70 is executed.

On the other hand, when an item 70 is pointed through an operation from a state in which the touch panel is not touched by a stick 24, etc., that is, a input-absent-state (touch-off state) to a state in which the touch panel 22 is touched, that is, an input-present-state (touch-on state), the cursor 72 is displayed on the pointed item 70 to show that the item 70 is being selected. In FIG. 3, a menu item 2 arranged at the second from the top is instructed by the stick 24, etc., so that the cursor 72 is displayed on the menu item 2.

Figure 4:
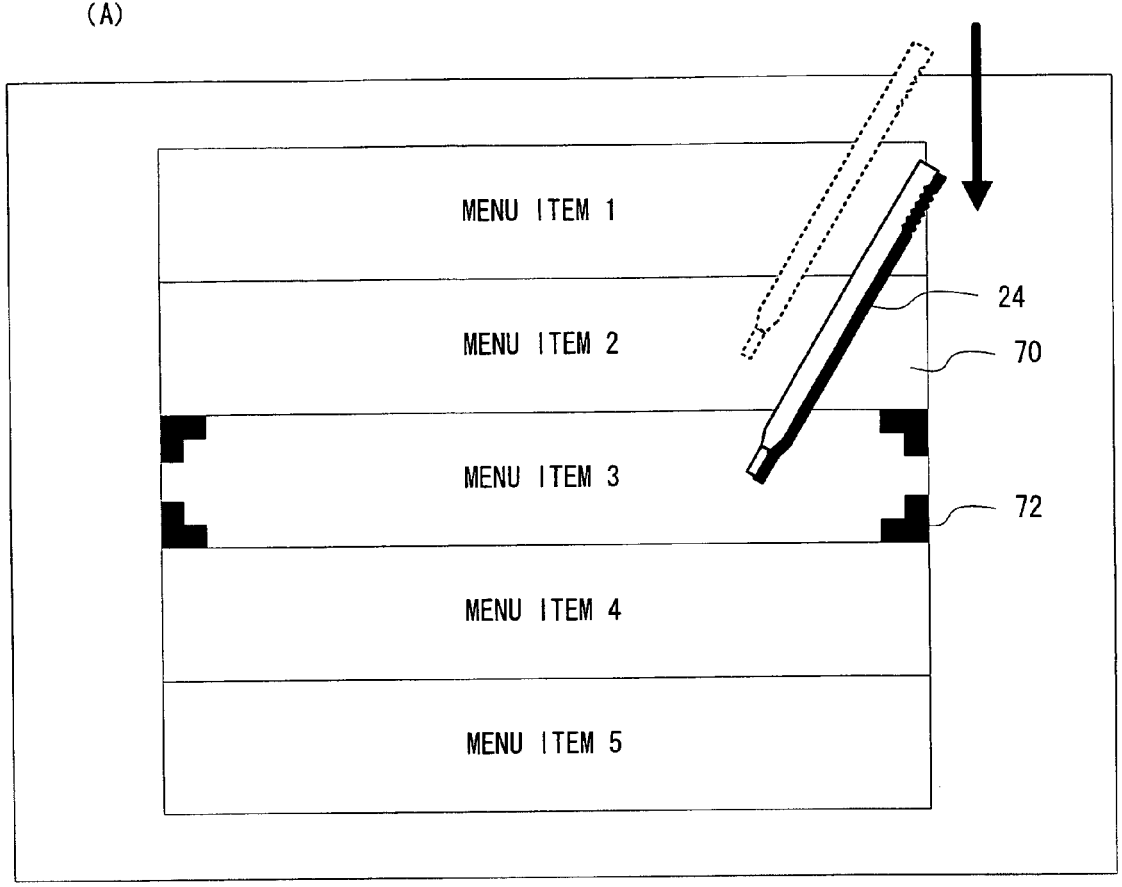
FIG. 4(A) is an illustrative view showing one example of a display screen where a pointing position is downwardly moved in a touch-on state.
FIG. 4(B) shows an operation of an operation key corresponding to an operation with a touch panel in FIG. 4(A)
Figure 4:
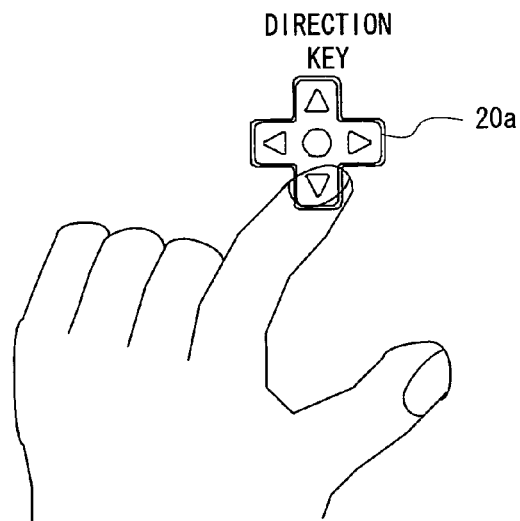

Thereafter, when the pointing position moves (slides) on an item 70 in the touch-on state, that is, in a state the stick 24, etc. is touched on the touch panel 22, the cursor 72 moves to the pointed item 70 according to the movement. FIG. 4(A) shows a case where the pointing position is downwardly moved from the item 2 to the item 3 in the touch-on state to move the cursor 72 on the item 3. The touch operation to the downward direction corresponds to a depression operation of the part indicating the down direction of the direction key 20*a* out of the operating switch 20.

Thus, in this embodiment, it is possible to select an item 70 by performing a touch operation from the touch-off state, and it is also possible to select an item 70 by sliding the pointing position in the touch-on state.

Figure 5:
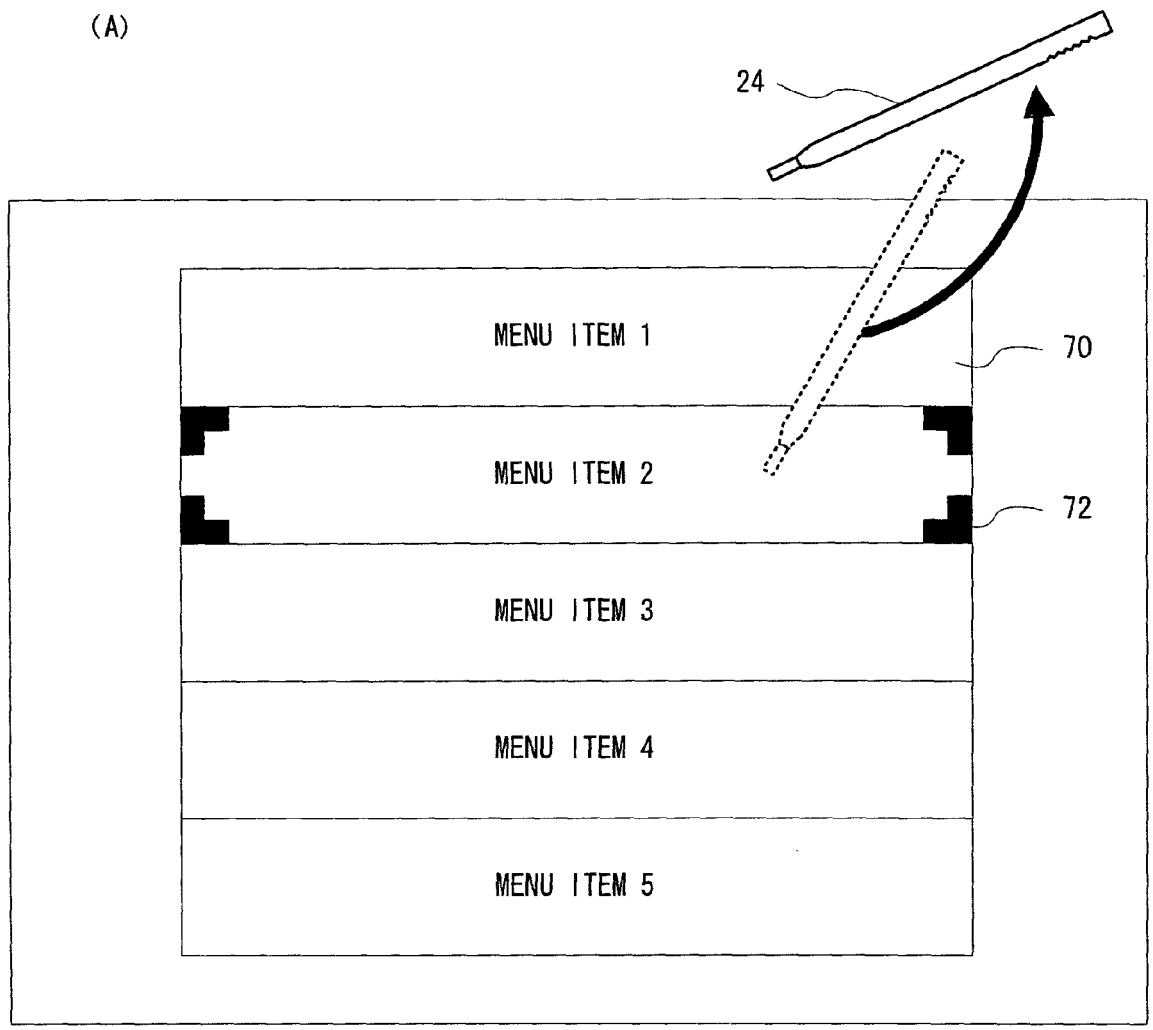
FIG. 5(A) is an illustrative view showing a touch-off operation before a predetermined time elapses from a touch-on, and FIG. 5(B) shows an operation of the operation button corresponding to an operation with the touch panel in FIG. 5(A)
Figure 5:
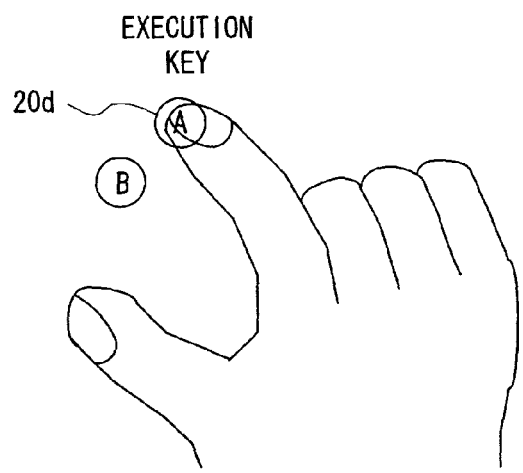

In addition, in order to execute a process or operation corresponding to the selected item 70 with the touch panel 22, it is necessary to release the stick 24, etc. from the touch panel 22. That is, an operation shifted from the touch-on state to the touch-off state is an execution instructing operation, and in response to the operation, the process corresponding to the selected item 70 is activated. In FIG. 5(A), a touch-off operation is performed in a state the cursor 72 is displayed on the item 2 to allow execution of a process corresponding to the item 2 in the selecting state. The operation corresponds to a depressing operation of the execution key 20*d* out of the operating switch 20 as shown in FIG. 5(B).

As described above, as to the operation with the operating switch 20, an item selection is performed by the direction key 20*a*, and execution thereof is activated by the execution key 20*d*. That is, selection and execution are not successive. Thus, in a case of utilizing the operating switch 20, the user tentatively selects the item 70, then, selects another item again, and executes the selected item, for example. This allows the user to execute operations at his own discretion.

On the other hand, as to the operation with the touch panel 22, a touch-on operation allows the item 70 to be selected, and basically a touch-off operation thereafter allows the process corresponding to the selected item 70 to be executed. That is, selection and execution are successively performed. When the user already decides the item 70 to be selected, performing the selection and execution in series presents no problem. However, in a case of being reflecting on or wavering over which item 70 to be selected, because the user must perform a touch-off operation on the item 70 desired to be executed, the user has to continue to perform a touch-on operation on the item until he or she decides the item 70, which is inconvenient.

Consequently, the information processing apparatus 10 provides a condition for activating a selected item execution process by the touch-off operation, determines whether or not the condition is satisfied, and activates the process when the condition is satisfied according to the determination result in order to allow the operation with the touch panel 22 to be executed in the same sense as the operation with the direction key 20*a* and the execution key 20*d*. In other words, an execution right that is made ineffective under a predetermined condition in the selected item execution process caused by the touch-off operation is provided, and if the execution right survives at a time of the touch-off, the process is activated.

Figure 6:
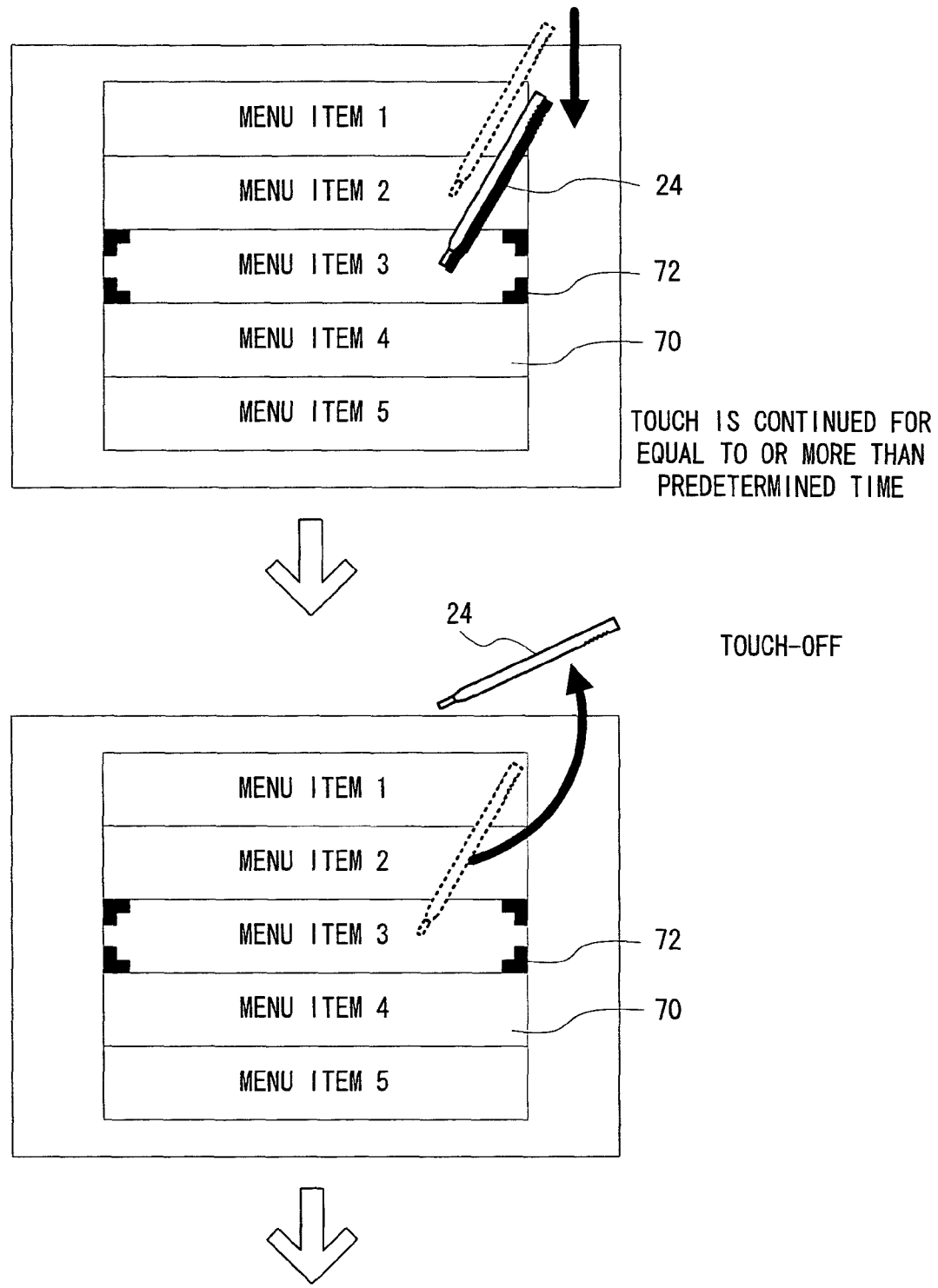

Specifically, in this embodiment, in a case that the touch-on state is shifted to the touch-off state before a predetermined time period elapses from the start of the touch-on, the process corresponding to the selected item is executed, and in a case that the touch-on state is shifted to the touch-off state after the predetermined time period elapses from the start of the touch-on, the process corresponding to the selected item is not executed. The user tends to instruct the execution relatively quickly when having no hesitation to select the item, and therefore, the setting of the condition is fit for the user's operation senses, and improves operability. For example, as shown in FIG. 6, when the touch-on state is shifted to the touch-off state after the touch operation continues for the predetermined time period or above from the start of the touch-on, the process corresponding to the selected item is not activated. Thus, the user can only perform a moving display of the cursor 72, that is, a change of selected item 72 tentatively by making the touch-on state continued for equal to or more than the predetermined time period.

Figure 7:
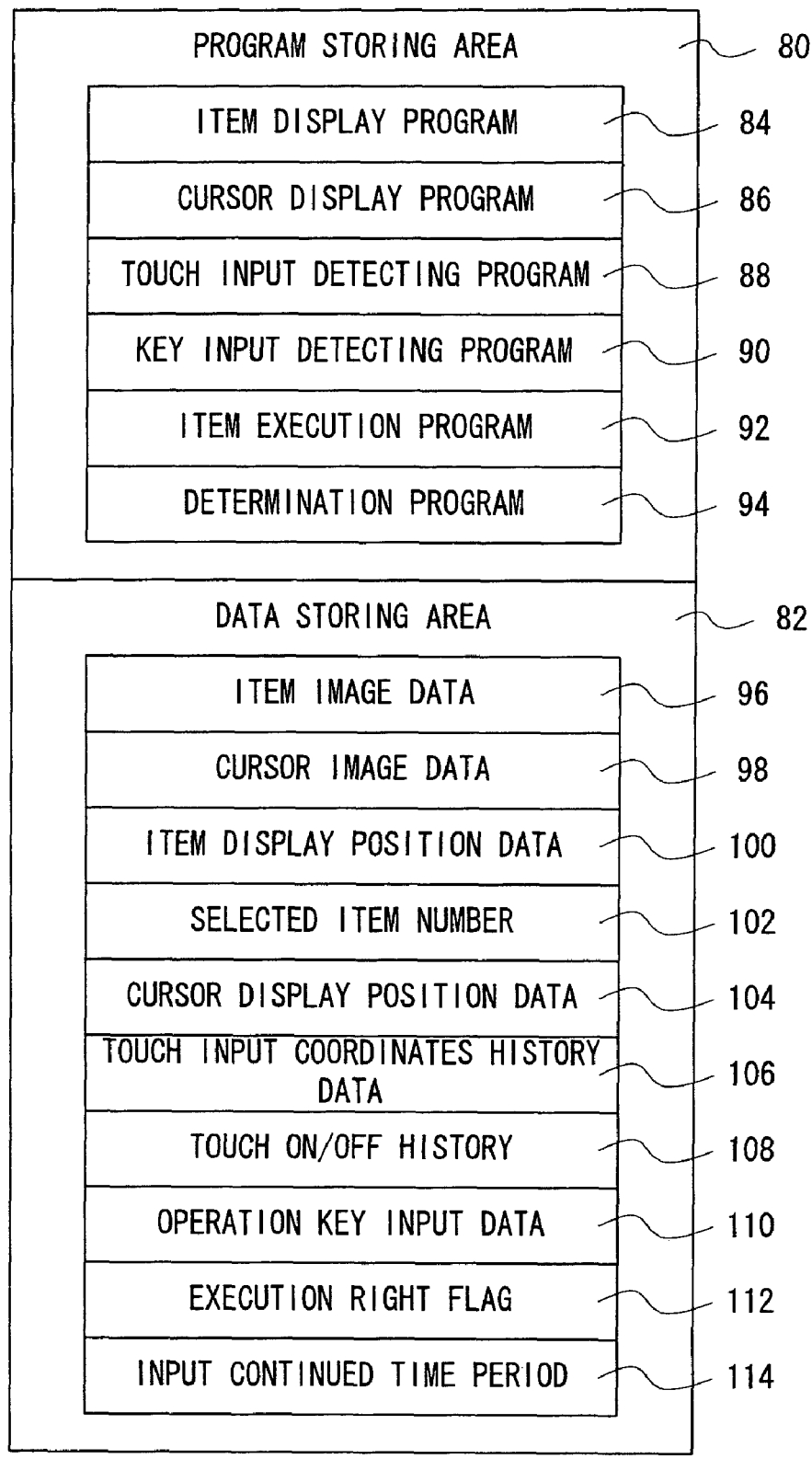
FIG. 7 is an illustrative view showing one example of a memory map of a RAM.

FIG. 7 shows one example of a memory map of the RAM 48. The RAM 48 includes a program storing area 80 and a data storing area 82. It is noted that FIG. 7 shows only a part of the memory map, and the RAM 48 stores various programs and data required for progress of the game.

An item display program storing area 84 stores a program for displaying on the LCD 14 a menu screen including the plurality of items 70 as an object to be selected. The cursor display program storing area 86 stores a program for displaying the cursor 72 for indicating the selecting item 70 on the menu screen.

A touch input detecting program storing area 88 stores a program for detecting coordinates data of a pointing position when the user inputs with the touch panel 22. A key input detecting program storing area 90 stores a program for detecting operation data when the user inputs with the operating switch 20.

An item execution program storing area 92 stores a program for executing a process or operation corresponding to the selecting item 70. A determination program storing area 94 stores a program for determining a condition to activate the process corresponding to the selecting item (item execution program) at a time of the touch-off operation. That is, in this embodiment, at a time of the touch-off, it is determined whether or not the touch-on state continues for equal to or more than a predetermined time period.

Furthermore, an item image data storing area 96 stores image data for displaying the plurality of items 70 in association with an identification number (item number) of each of the items 70, for example. A cursor image data storing area 98 stores image data for displaying the cursor 72.

An item display position data storing area 100 stores data indicating display position coordinates of each of the plurality of items 70 in association with the item number. The coordinates data of the pointing position fetched from the data output from the touch panel 22 is checked with the item display position data to specify the item 70 pointed (selected) by the user. A selected item number storing area 102 stores an identification number of the selected item 70. It is noted that an identification number of the menu item 1 at the uppermost line is stored as a default value in FIG. 3 example. A cursor display position data storing area 104 stores data indicating display position coordinates of the cursor 72. The display position of the cursor 72 is decided in advance in correspondence with each item 70. In this embodiment, since the cursor 72 is displayed on the item, the display position coordinates of the selecting item 70 is stored to display the cursor 72 on the basis of the item display position data, for example.

A touch input coordinates history data storing area 106 stores a history of the coordinates data indicative of an input pointing position detected from output data in response to an operation of the touch panel 22 by the user. For example, the coordinates data detected in the current frame and in the previous frame are stored. It is noted that one frame corresponds to 1/60 seconds, for example, in this embodiment. A touch-on/off history storing area 108 stores a history of an operating state of the touch panel 22 (touch-on or touch-off). For example, touch states as to the current frame and the previous frame are stored. An operation key input data storing area 110 stores operation data detected from output data in response to an operation of the operation key (operating switch) 20 by the user.

An execution right flag storing area 112 stores execution right flag data indicating whether or not the process corresponding to the selected item can be executed. As a result of determination of the determination program, if the process can be executed, an execution right flag is turned on ("1", for example), and if the process cannot be executed, the execution right flag is turned off ("0", for example).

An input continued time period storing area 114 stores data indicative of an input continued time period, that is, duration of the touch-on state. Measuring the input continued time period is started when the touch-off state is shifted to the touch-on state (on the item 70).

Figure 8:
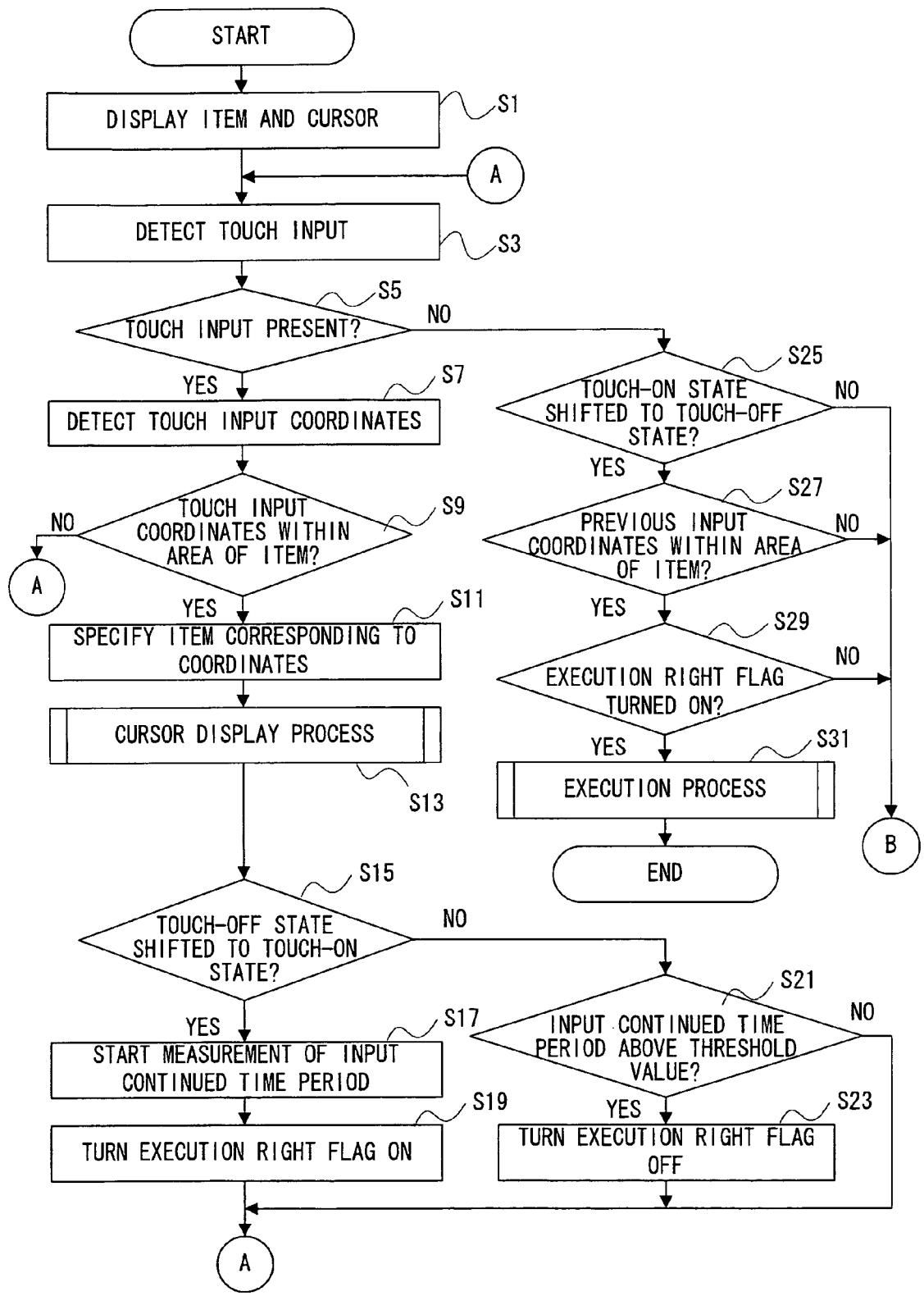
FIG. 8 is a flowchart showing a part of example of an operation of the information processing apparatus.
Figure 9:
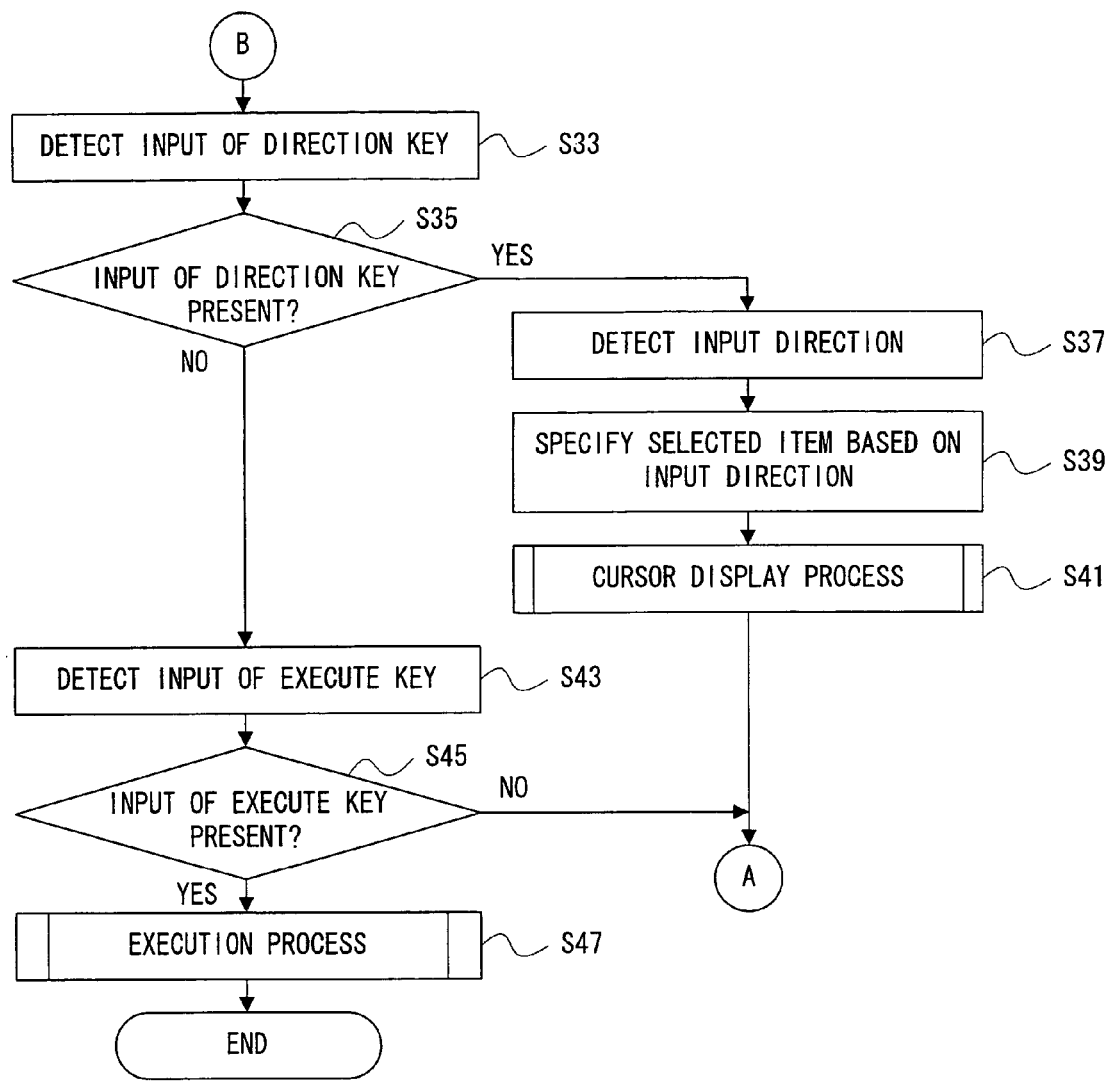
FIG. 9 is a flowchart showing a continued operation of FIG. 8.

FIG. 8 and FIG. 9 show one example of an operation in a menu item selecting process of the information processing apparatus 10 of this embodiment. First, in a step S1, the CPU core 42 displays a menu screen including the plurality of items 70 and the cursor 72 on the basis of an item display program, a cursor display program, item image data, cursor image data, etc. by utilizing the GPU 50 or the GPU 52, and the LCD controller 60, etc. on the LCD 14 provided with the touch panel 22. Each item 70 is displayed at a position indicated by each item display position data, and the cursor 72 is displayed at a position indicated by the cursor display position data.

Next, in a step S3, the CPU core 42 detects an operation input by the touch panel 22. For example, the CPU core 42 fetches output data of the touch panel 22 from a buffer of the I/F circuit 54 to the RAM 48. Then, in a step S5, the CPU core 42 determines whether or not a touch input is present on the basis of the fetched output data of the touch panel 22. If "YES" in the step S5, that is, if the output data indicates presence of the operation input with the touch panel 22 (touch-on state), the CPU core 42 detects coordinates of the position pointed by the touch input from the obtained output data, and stores the coordinates data as current frame data in the touch input coordinates history data storing area 106 in a step S7. It is noted that the current frame data that has already been stored is stored as previous frame data. The touch-on/off history storing area 108 stores the current frame data that has already been stored as the previous frame data, and stores the fact that the current frame is in the touch-on.

Then, in the step S9, the CPU core 42 determines whether or not the touch input coordinates are within an area of the item 70 on the basis of the touch input coordinates data of the current frame and the item display position data. If "NO" in the step S9, the touch is made at an area except for the area of the item 70, then, the process returns to the step S3.

On the other hand, if "YES" in the step S9, that is, if a touch operation is performed on the item 70, the CPU core 42 specifies an item 70 corresponding to the input coordinates out of the plurality of items 70 on the basis of the input coordinates data of the current frame and the item display position data, and stores an item number of the specified item 70 in a selected item number storing area 102 in a step S11.

Figure 10:
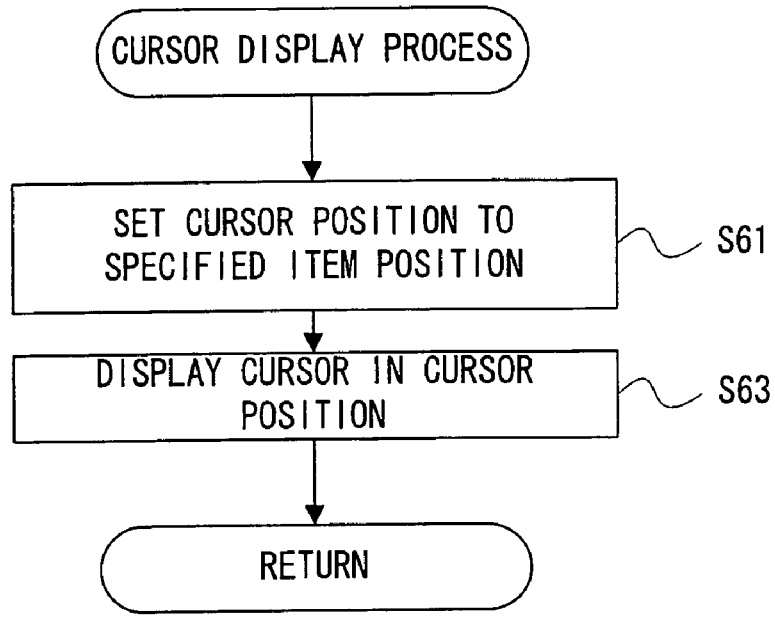
FIG. 10 is a flowchart showing one example of an operation of a cursor displaying process in FIG. 8 and FIG. 9.

Then, in a step S13, the CPU core 42 executes a cursor display process. An operation of the cursor display process is shown in FIG. 10. In a step S61 in FIG. 10, the CPU core 42 set the cursor position to the position of the specified item 72. More specifically, the CPU core 42 copies the item display position data corresponding to the specified item number, and stores it in the cursor display position data storing area 104. Then, in a step S63, the CPU core 42 displays the cursor 72 at the set cursor position on the basis of the cursor position data, etc. by utilizing the GPU 50 or 52 and LCD controller 60, etc. After completion of the step S63, the cursor display process is ended and returned to the menu selecting process in FIG. 8 or FIG. 9.

Returning to FIG. 8, in a succeeding step S15, the CPU core 42 determines whether or not the touch-off state is shifted to the touch-on state on the basis of the data of the touch-on/off history storing area 108. If "YES" in the step S15, the CPU core 42 starts to measure an input continued time period, and stores the measured time period in the input continued time period storing area 114 in a step S17. For example, a timer for counting the number of frames that elapses during the continued touch-on state may be set, or an input continued time period may be calculated on the basis of time information of a clock IC not shown. Furthermore, in a step S19, the CPU core 42 stores "1", for example, in the execution right flag storing area 112 to turn the execution right flag on.

On the other hand, if "NO" in the step S15, that is, if the touch-on state is continued, the CPU core 42 determines whether or not the measured input continued time period exceeds a predetermined threshold value on the basis of the input continued time period data in a step S21. If "YES" in the step S21, that is, if the touch-on state is continued for equal to or more than the predetermined time period after it is shifted to the touch-on operation, the CPU core 42 stores "0", for example, in the execution right flag storing area 112 to turn the execution right flag off in a step S23.

It is noted that where the step S19 or step S23 is ended, or if "NO" is determined in the step S21, the process returns to the step S3.

On the other hand, if "NO" in the step S5, that is, if it is in the touch-off state, the CPU core 42 stores the current frame data that has already been stored as the previous frame data, and stores coordinates data having no coordinates as the current frame data by updating the touch input coordinates history data storing area 106 before the step S25. Furthermore, the CPU core 42 stores the current frame data that has already been stored as the previous frame data, and stores data indicative of the touch-off as a current frame data by updating the touch-on/off history storing area 108. Then, in a step S25, the CPU core 42 determines whether or not the touch-on state is shifted to the touch-off state on the basis of the touch-on/off history data. If "YES" in the step S25, that is, if the touch-off operation is performed, the CPU core 42 determines whether or not the touch input coordinates of the previous frame is within the area of the item 70 on the basis of the item display position data and the touch input coordinates history data in a step S27. It is noted the determination is made on the area of all the items 70 in this embodiment. Thus, an execution instructing operation (touch-off operation) at a position corresponding to the item 70 is required, and therefore, it is possible to intuitively and simply instruct execution of the selected item 70.

Figure 11:
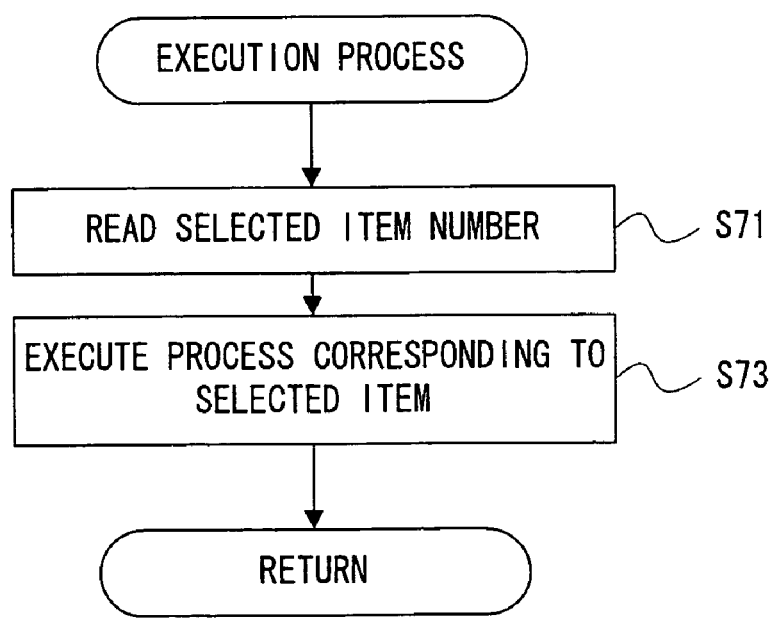
FIG. 11 is a flowchart showing one example of an operation of an executing process in FIG. 8 and FIG. 9.

If "YES" in the step S27, that is, if the touch-off operation is performed within the display area of each of the plurality of items 70, the CPU core 42 determines whether or not the execution right flag is turned on with referring to the execution right flag storing area 112 in a step S29. If "YES" is determined in the step S29, the CPU core 42 executes an execution process in a step S31 to end the process on the menu screen. An operation of the execution process is shown in FIG. 11. In a step S71 in FIG. 11, the CPU core 42 reads the data from the selected item number storing area 102 to a work area of the RAM 48. Then, in a step S73, the CPU core 42 activates an item execution program for executing a process corresponding to the selected item on the basis of the read item number to execute the process or operation corresponding to the selected item.

Returning to FIG. 8, if "NO" in the step S25, that is, if the touch-off state is continued, the process proceeds to a step S33 in FIG. 9 in order to execute a process based on the operation key 20. If "NO" in the step S27, that is, if the touch-off operation is performed in an area except for the display area as to the plurality of items 70, the process proceeds to the step S33 in FIG. 9. In addition, If "NO" in the step S29, that is, if a condition for execution at a time of the touch-off is not satisfied, that is, if the touch input is continued for equal to or more than the predetermined time period before the touch-off, the process corresponding to the selected item is not executed, and the process proceeds to the step S33 in FIG. 9.

In the step S33 in FIG. 9, the CPU core 42 detects an input of the direction key 20a out of the operating switch 20. For example, the CPU core 42 fetches operation data from the direction key 20a of the operating switch 20 from the buffer of the I/F circuit 54 to store it in the operation key input data storing area 110 of the RAM 48. Succeedingly, in a step S35, the CPU core 42 determines whether or not an input of the direction key 20a is present on the basis of the fetched operation data of the direction key 20a. If "YES" in the step S35, the CPU core 42 detects an input direction from the fetched operation data in a step S37. In a succeeding step S39, the CPU core 42 specifies the selected item 70 on the basis of the detected input direction data. For example, it is determined whether or not another item 70 exists in a detected direction of the selecting item 70 on the basis of data of the selected item number storing area 102, the item display position data and the detected input direction data. As a result, if another item 70 exists, the identification number of this item 70 is stored in the selected item number storing area 102. Furthermore, the cursor display position is set to the position corresponding to the specified item 70. For example, the item display position data of the specified item 70 is stored in the cursor display position data storing area 104. Then, the CPU core 42 executes a cursor display process in FIG. 10 similar to the above-described step S13 in a step S41. After completion of the step S41, the process returns to the step S3 in FIG. 8.

On the other hand, if "NO" in the step S35, that is, if an operation of the direction key 20a is absent, the CPU core 42 detects an input of the execution key 20d out of the operating switch 20 in a step S43. For example, the CPU core 42 fetches operation data from the execution key 20d out of the operating switch 20 from the buffer of the I/F circuit 54, and stores it in the operation key input data storing area 110 of the RAM 48. Succeedingly, in a step S45, the CPU core 42 determines whether or not an input of the execution key 20d is present on the basis of the fetched operation data of the execution key 20d. If "NO" in the step S45, that is, if the operation of the execution key 20d is not present, the process returns to the step S3 in FIG. 8. On the other hand, if "YES" in the step S45, the CPU core 42 executes an execution process in FIG. 11 similar to the above-described step S31, and ends the process on the menu screen.

According to this embodiment, in a case that an operation of the touch panel 22 is present on the menu selection screen, selection of the item 70 (movement of the cursor 72) is performed on the basis of the pointing position of the touch input, and a process by the touch-off operation as to the selected item 70 is executed if the touch input continued time is not equal to or more than the predetermined time period. That is, a process by the touch-off operation as to the selected item 70 is not executed when the touch input is continued for equal to or more than the predetermined time period. Accordingly, mere selection of the item 70, that is, selection without execution of the process corresponding to the item 70 and movement of the cursor 72 can be performed through the operation of the touch panel 22 in a similar manner as to the operation of the direction key 20a out of the operation key 20. Furthermore, execution of the process corresponding to the selected item 70 can be performed by the touch-off operation before the input continued time with respect to the touch panel 22 exceeds the predetermined time period similar to the operation of the execution key 20d out of the operation key 20. Thus, by both the operation with the operating switch 20 such as the direction key 20a, the execution key 20d, etc. and the operation with the touch panel 22, it is possible to instruct selection of the item 70 and activation of the process or operation corresponding to the selected item 70. The user is allowed to use the both operation at his own discretion, capable of improving operability when instructing selection of the item 70 and execution of the process or operation corresponding to the selected item 70, that is, operability in selecting the menu item.

In addition, in selecting the item 70, in a case of utilizing the direction key 20a, the user can move the cursor 72 toward a desired item 70 by instructing the direction in which the item 70 to be selected exists. In a case of utilizing the touch panel 22, the user can move the cursor 72 toward the desired item 70 by the operation similar to the direction key 20a, that is, by the operation of moving the pointing position to the direction in which the item 70 to be selected exists with the stick, etc. 24. Then, when the user wants to activate the process corresponding to the selected item 70, in a case of utilizing the execution key 20d, he or she merely depress the key 20d, and in a case of utilizing the touch panel 22, he or she merely performs the touch-off operation on the item 70 within a predetermined time period from the touch-on. This allows the user to have the same sense in operating with either the operating switch 20 or the touch panel 22, capable of realizing the information processing apparatus 10 high in operability at a time of selecting the menu item.

It is noted that a condition for activating a process at a time of the touch-off is set on the basis of the touch input continued time in the above-described embodiment. However, in another embodiment, the condition may be set on the basis of the pointing position of the touch input.

Figure 12:
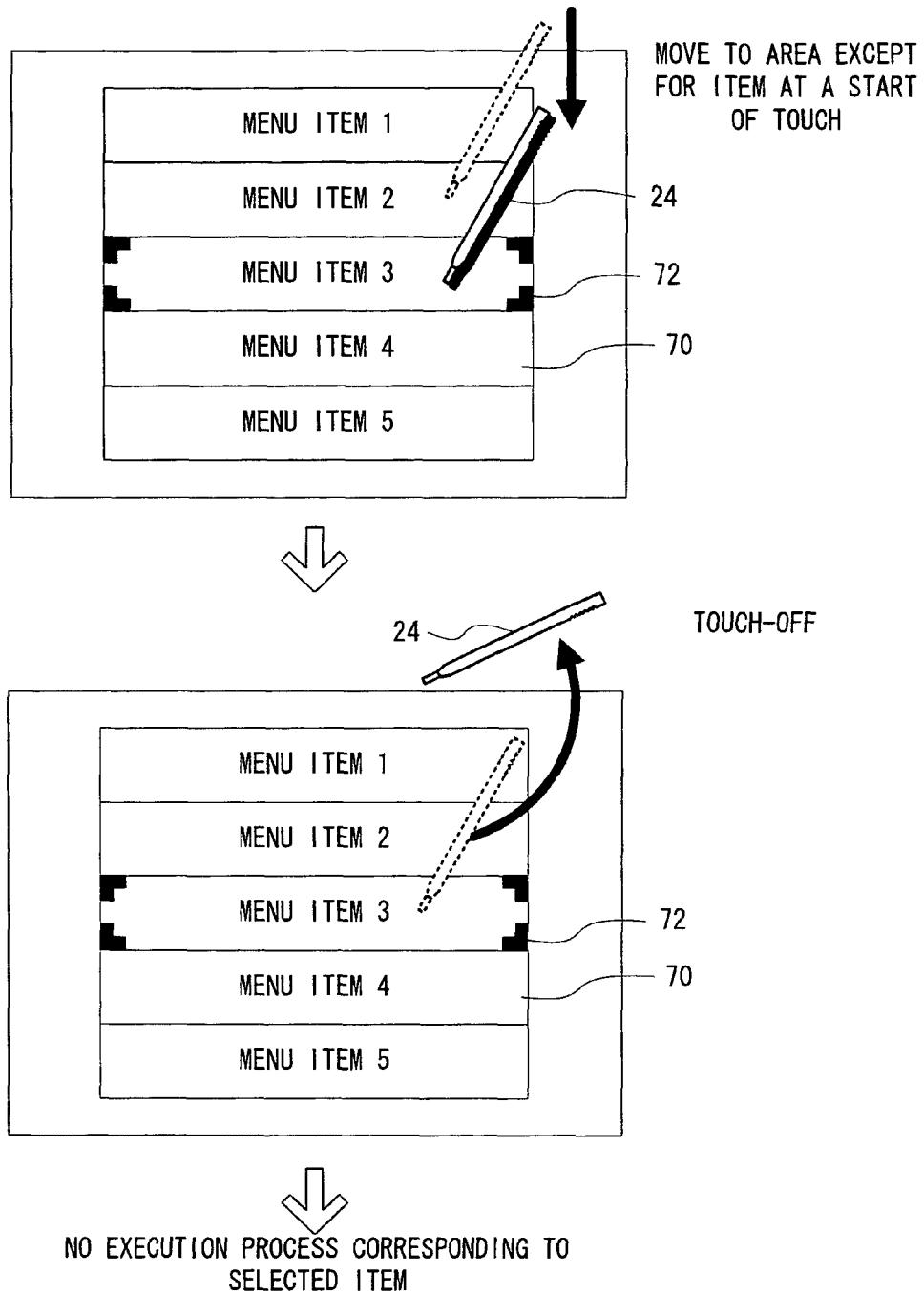
FIG. 12 is an illustrative view for explaining a process where a touch-off operation is made after the pointing position is moved to an area except for the area of an item selected at a time of a touch-on in another embodiment.

That is, in another embodiment shown in FIG. 12, in a case that the touch-on state is continued, when the touch input position becomes an area except for the area of the item 70 selected at a start of the touch, the process corresponding to the selected item 70 to be activated by the touch-off is not executed, and when the touch input position is continued to be pointed within an area of the item 70 selected at a start of the touch, the process corresponding to the selected item 70 to be activated by the touch-off is executed. In FIG. 12 example, the menu item 2 is instructed at a start of the touch. However, after the pointing position is moved to the selected menu item 3 by the stick, etc. 24, a touch-off operation is performed, and therefore, a process corresponding to the menu item 3 is not performed.

Figure 13:
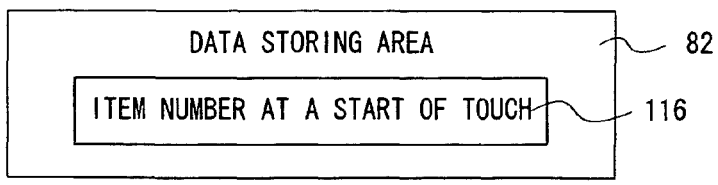
FIG. 13 is an illustrative view showing a part of data storing area of a memory map in FIG. 12 embodiment.

FIG. 13 shows a part of a memory map of the RAM 48 in FIG. 12 embodiment. That is, in this embodiment, the data storing area 82 further includes an item number storing area at a start of the touch 116. The storing area 116 stores an identification number of an item (start item) pointed when the touch-off state is shifted to the touch-on state.

Figure 14:
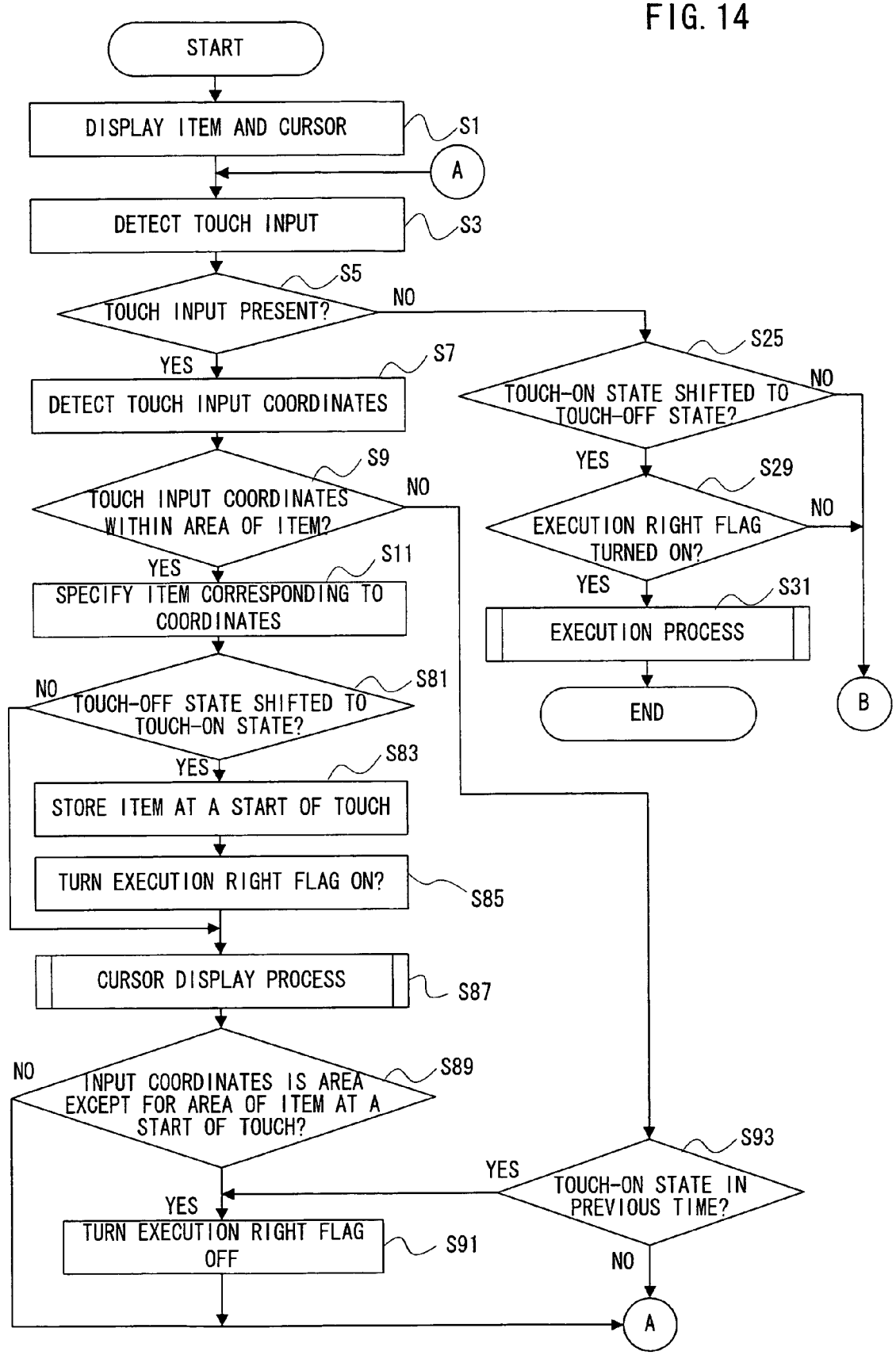
FIG. 14 is a flowchart showing a part of one example of an operation of FIG. 12 embodiment.

FIG. 14 shows one example of a part of the menu item selecting process in FIG. 12 embodiment. FIG. 14 corresponds to the above-described embodiment in FIG. 8, and a process continued to FIG. 14 is shown in FIG. 9. In FIG. 14, the same reference numeral is applied to the process the same as the above-described FIG. 8 to omit a detailed description thereof.

In a step S11 shown in FIG. 14, an item corresponding to the touch input coordinates is specified, and then, the CPU core 42 determines whether or not the touch-off state is shifted to the touch-on state on the basis of the data in the touch-on/off history storing area 108 in a step S81. If "YES" in the step S81, that is, if the touch input is started, the CPU core 42 stores the identification number of the pointing item 70 specified in the step S11 in the item number storing area at a start of the touch 116 in a step S83. Furthermore, in a step S85, the CPU core 42 turns on the execution right flag in the execution right flag storing area 112.

After completion of the step S85, or if "NO" in the step S81, the CPU core 42 executes a cursor display process in the above-described FIG. 10 in a step S87. Succeedingly, in a step S89, the CPU core 42 determines whether or not the input coordinates of the current frame exists in an area except for the area of the item at a start of the touch. For example, it is determined whether or not the touch input coordinates of the current frame in the touch input coordinates history data storing area 106 exists in the area except for the display area of the item 70 based on the item display position data in the item display position data storing area 100 corresponding to the identification number stored in the item number storing area at a start of the touch 116. If "YES" in the step S89, that is, if an item 70 different from the item 70 at a start of the touch is instructed, the CPU core 42 turns an execution right flag in the execution right flag storing area 112 off in a step S91. After completion of the step S91, or if "NO" in the step S89 (instructing the selected item 70 at a start of the touch is continued), the process returns to the step S3.

On the other hand, if "NO" in the step S9, that is, if the area except for the area of the plurality of items 70 in the touch-on state is instructed, the CPU core 42 determines whether or not the previous frame is the touch-on state on the basis of the touch-on/off history data in a step S93. If "YES" in the step S93, that is, if the pointing position is moved to the area except for the area of the plurality of items 70 in a state that the touch-on is continued, the CPU core 42 turns the execution right flag off in the step S91. Thus, it is possible to prevent the process from being activated when the pointing position is moved from the item 70 at a start of the touch to the area except for the display area of the plurality of items 70 immediately before the touch-off operation. It is noted that if "NO" in the step S93, (if the area except for the display area of the plurality of items 70 is pointed at a start of the touch), the process returns to the step S3.

Furthermore, if "YES" in the step S25, that is, if the touch-off operation is performed in the touch-on state, the CPU core 42 determines whether or not the execution right flag is turned on in a succeeding step S29. If "YES" in the step S29, that is, if the touch-off operation is performed within the display area without the area except for the display area of the item 70 selected at a start of the touch being pointed, the CPU core 42 executes an execution process in the step S31 shown in FIG. 11, and ends the menu selecting process. Furthermore, if "NO" in the step S29, that is, if the area except for the item 70 selected at a start of the touch is pointed even once before the touch-off operation, the process proceeds to the step S33 in FIG. 9.

According to the above-described embodiment, the process corresponding to the selected item 70 is executed when the display area of the item 70 selected at a start of the touch continues to be instructed before the touch-off operation. That is, when the area except for the display area of the item 70 selected at a start of the touch is instructed even once, by regarding that user is searching a desired item 70, thinking about it or wavering, a process corresponding to the selecting item 70 is not activated. Accordingly, mere selection of the item 70 and movement of the cursor 72 can be performed with the operation of the touch panel 22 similar to the operation of the direction key 20a of the operation key 20. Furthermore, execution of the process corresponding to the selected item 70 can be instructed by performing the touch-off operation without an area except for the display area of the item 70 selected at a start of the touch with respect to the touch panel 22 being instructed, similar to the operation of the execution key 20d out of the operation key 20. Thus, by both the operation with the operating switch 20 such as the direction key 20a, the execution key 20d, etc. and the operation with the touch panel 22, it is possible to perform the selection of the item 70, and the process corresponding to the selected item 70. Accordingly, similar to the above-described embodiment, it is possible to improve operability at a time of instructing selection of the item 70 and a process or operation corresponding to the selected item 70. The user can operate while feeling the same sense in operating with either the operating switch 20 or the touch panel 22, capable of making operability in selecting menu superior.

It is noted that in the above-described embodiment, a condition for activating the process by the touch-off operation is that display area of the item 70 selected at a start of the touch continues to be pointed before the touch-off. However, in another embodiment, the condition may be that a distance between coordinates at a start of the touch and coordinates thereafter continues to be within the predetermined distance. That is, in FIG. 14, if "YES" in the step S81, in place of storing an item at a start of the touch in the step S83, the touch coordinates are stored, and in place of determining whether or not an input coordinates is present in an area except for the area of the item at a start of the touch operation in the step S89, it is determined whether or not an input coordinates is present at a position equal to or more than a predetermined distance away from the touch coordinates (touch coordinates at a start of the touch) stored in the step S83.

It is noted that in each of the above-described embodiments it is determined whether or not the coordinates pointed by the touch input is the display position (display area) of each item 70 on the basis of the item display position data indicating the display position coordinates corresponding to each of the plurality of items 70. Thus, according to the operation of the touch panel 22, the selected item 70 is specified. However, in the other embodiment, a predetermined area or predetermined position for selecting each item 70 may be provided in association with each item 70 at a position different from the position of the display area of each of the plurality of items 70. That is, item position data indicative of position coordinates (predetermined area) corresponding to each of the plurality of items 70 is stored in advance, and it is determined whether or not the coordinates pointed by the touch input is a position corresponding to each item 70. Thus, an item 70 selected by the operation with the touch panel 22 may be specified. In this case, in an embodiment corresponding to FIG. 12, for example, as a condition for executing the process corresponding to the selected item 70, not determining that the coordinates of the pointing position detected before the touch-off continues to be within the display area of the item 70 selected at a start of the touch, but determining that whether or not the coordinates continues to be a position coordinates (predetermined area) corresponding to the item 70 selected at a start of the touch.

Furthermore, in each of the above-described embodiments, detection of an input by the touch panel 22 is performed before detection of an input by the direction key 20*a* and the execution key 20*d* to perform by priority the process corresponding to the touch input when an input is present by the touch panel 22. On the contrary thereto, the detection of an input by the operation key 20 may be performed at first to perform the corresponding process by priority when an input is present by the direction key 20*a* and the execution key 20*d*.

Furthermore, in each of the above-described embodiments, the information processing apparatus 10 includes the touch panel 22 placed on the menu screen as one input means for selecting and executing the item 70. However, the input means may be any devices that can instruct a position (coordinates) on the screen, that is, other pointing devices such as a track pad, a tablet, etc. may be applied. In this case, for example, item position data bringing each of the plurality of items 70 on the menu screen into correspondence with position coordinates on an input area of the pointing device is stored in advance, and the item 70 corresponding to the pointing position is specified on the basis of the item position data. It is noted that a mouse is utilized as the pointing device, and a state in which a button of the mouse is depressed is regarded as a touch-on state while a state in which the button of the mouse is released is regarded as the touch-off state. Thus, it is possible to determine whether or not an input by the pointing device is present. In addition, the cursor 72 is utilized as a mouse pointer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus provided with a display for displaying a screen including a plurality of items, a specifying means for specifying a selected item from the plurality of items using a direction key, the direction key for changing the selected item of the plurality of items, a specifying means for specifying a selected item by the direction key, an execution key for instructing execution of a process corresponding to the selected item specified by said specifying means, and an executing means for executing the process corresponding to the selected item specified by said specifying means when said execution key is operated, further comprising:
   a pointing device for pointing a position on said screen;
   an input detecting means for detecting presence or absence of an input by said pointing device;
   a measuring means for measuring a time continued in an input-present-state detected by said input detecting means;
   a first condition determining means for determining whether or not the time measured by said measuring means is above a threshold value;
   a coordinates detecting means for detecting coordinates of the position input by said pointing device, and
   a storage device storing item position data indicative of position coordinates corresponding to each of said plurality of items, wherein
   said specifying means specifies and changes said selected item by specifying said selected item corresponding to said coordinates detected by said coordinates detecting means on the basis of said item position data,
   said executing means, when it is detected that the input-present-state is shifted to an input-absent-state by said input detecting means, does not execute a process corresponding to said selected item specified by said specifying means if said time is above said threshold value as determined by said first condition determining means, and executes the process corresponding to said selected item specified by said specifying means if said time is not above said threshold value as determined by said first condition determining means.

2. An information processing apparatus according to claim 1, further comprising a specified-item-representing-image display controlling means for displaying an image representing the selected item specified by said specifying means.

3. An information processing apparatus according to claim 1, wherein
   said executing means, when it is detected that the input-present-state is shifted to said input-absent-state by said input detecting means, and said coordinates detected at a time of detecting that state by said coordinates detecting means indicate the position corresponding to said selected item based on said selected item position data, does not execute the process corresponding to the selected item specified by said specifying means in a case that it is determined that said time is above said threshold value by said first condition determining means, and executes the process corresponding to said selected item specified by said specifying means in a case that it is determined that said time is not above said threshold value by said first condition determining means.

4. A storage medium storing an item selection processing program of an information processing apparatus provided with a display for displaying a screen including a plurality of items, a direction key for changing a selected item out of said plurality of items, wherein the selected item is selected in accordance with a specifying step, an execution key for instructing execution of a process corresponding to the selected item by said direction key, a pointing device for pointing a position on said screen, and a storage device storing item position data indicating position coordinates corresponding to each of said plurality of items,
   said item selection processing program causes a processor of said information processing apparatus to execute:
   the specifying step for specifying the selected item by said direction key;
   an executing step for executing a process corresponding to the selected item specified by said specifying step when said execution key is operated;
   an input detecting step for detecting presence or absence of an input by said pointing device;
   a measuring step for measuring a time continued in an input-present-state detected by said input detecting step;
   a first condition determining step for determining whether or not said time measured by said measuring step is above a threshold value, and
   a coordinates detecting step for detecting the coordinates of the position input by said pointing device, wherein said specifying step specifies and changes said selected item by specifying said selected item corresponding to said coordinates detected by said coordinates detecting means on the basis of said selected item position data, said executing step, when it is detected that the input-present-state is shifted to an input-absent-state by said input detecting step, does not execute the process corresponding to said selected item specified by said specifying step if said time is above said threshold value as determined by said first condition determining step, and executes the process corresponding to said selected item specified by said specifying step if said time is not above said threshold value as determined by said first condition determining step.

5. An information processing apparatus provided with a display for displaying a screen including a plurality of items, a specifying means for specifying a selected item from the plurality of items using a direction key, the direction key for changing the selected item of said plurality of items, an execution key for instructing execution of a process corresponding to the selected item specified by said specifying means, and an executing means for executing the process corresponding to the selected item specified by said specifying means when said execution key is operated, further comprising:

a pointing device for pointing a position on said screen;

an input detecting means for detecting presence or absence of an input by said pointing device;

a start determining means for determining whether or not an input detected by said input detecting means is shifted from the input-absent-state to the input-present-state;

a coordinates detecting means for detecting coordinates of the position input by said pointing device;

a storage device storing item position data indicative of position coordinates corresponding to each of said plurality of items, and a second condition determining means for determining whether or not said coordinates detected by said coordinates detecting means after the input-absent-state is shifted to the input-present-state continue to be in the position of said selected item specified on the basis of said selected item position data in correspondence to said coordinates detected by said coordinates detecting means when it is determined that the input-absent-state is shifted to the input-present-state by said start determining means; wherein said specifying means specifies and changes said selected item by specifying said selected item corresponding to said coordinates detected by said coordinates detecting means on the basis of said selected item position data, said executing means for determining, when the input-present-state is detected as being shifted to the input-absent-state by said input detecting means, to not execute a process corresponding to said selected item specified by said specifying means when the position of said selected item is not continued by said second condition determining means, and executes the process corresponding to said selected item specified by said specifying means in a case that the input-present-state is determined that being in the position of said selected item is continued by said second condition determining means.

6. An information processing apparatus according to claim 5, further comprising a specified-item-representing-image display controlling means for displaying an image representing the selected item specified by said specifying means.

7. An information processing apparatus according to claim 5, wherein said executing means, when it is detected that the input-present-state is shifted to the input-absent-state by said input detecting means, and said coordinates detected at a time of detecting that state by said coordinates detecting means indicate the position corresponding to said selected item based on said selected item position data, does not execute a process corresponding to said selected item specified by said specifying means in a case that it is determined that being in the position of said selected item is not continued by said second condition determining means, and executes the process corresponding to said selected item specified by said specifying means in a case that the input-present-state is determined that being in the position of said selected item is continued by said second condition determining means.

8. A storage medium storing an item selection processing program of an information processing apparatus provided with a display for displaying a screen including a plurality of items, a direction key for changing a selected item of said plurality of items, wherein the selected item is selected in accordance with a specifying step, an execution key for instructing execution of a process corresponding to the selected item selected by said direction key, a pointing device for pointing a position on said screen, and a storage device storing item position data indicating position coordinates corresponding to each of said plurality of items, said item selection processing program causes a processor of said information processing apparatus to execute:

the specifying step for specifying the selected item by said direction key;

an executing step for executing a process corresponding to the selected item specified by said specifying step when said execution key is operated;

an input detecting step for detecting presence or absence of an input by said pointing device;

a start determining step for determining whether or not an input detected by said input detecting means is shifted from the input-absent-state to the input-present-state;

a coordinates detecting step for detecting coordinates of the position input by said pointing device; and a second condition determining step for determining whether or not said coordinates detected after the input-absent-state is shifted to the input-present-state continue to be in the position of said selected item specified on the basis of said item position data in correspondence to said coordinates detected by said coordinates detecting step when it is determined that the input-absent-state is shifted to the input-present-state by said start determining step; wherein said specifying step specifies and changes said selected item by specifying said selected item corresponding to said coordinates detected by said coordinates detecting step on the basis of said selected item position data, said executing step, when it is detected that the input-present-state is shifted to the input-absent-state by said input detecting step, does not execute a process corresponding to said selected item specified by said specifying step if the position of said selected item is not continued as determined by said second condition determining step, and executes the process corresponding to said selected item specified by said specifying step if said selected item is continued as determined by said second condition determining step.

9. An information processing apparatus provided with a display for displaying a screen including a plurality of items, a direction key for selecting and changing an item of said plurality of items, a specifying means for specifying a selected item of the plurality of items by using said direction key, an execution key for instructing execution of a process corresponding to the selected item specified by said specifying means, and an executing means for executing the process corresponding to the selected item specified by said specifying means when said execution key is operated, further comprising:

a pointing device for pointing a position on said screen;

an input detecting means for detecting presence or absence of an input by said pointing device;

a start determining means for determining whether or not an input detected by said input detecting means is shifted from the input-absent-state to the input-present-state;

a coordinates detecting means for detecting coordinates of the position input by said pointing device;

a storage device storing item position data indicative of position coordinates corresponding to each of said plurality of items, and a third condition determining means for determining whether or not the coordinates detected by said coordinates detecting means after the input-absent-state is shifted to the input-present-state continue to be within a predetermined distance from said coordinates detected by said coordinates detecting means when the input-absent-state is shifted to the input-present-state; wherein said specifying means specifies and changes said selected item by specifying said selected item corresponding to said coordinates detected by said coordinates detecting means on the basis of said selected item position data, said executing means, when the input-present-state is shifted to the input-absent-state, does not execute the process corresponding to said selected item specified by said specifying means if the predetermined distance is not continued as determined by said third condition determining means, and executes the process corresponding to said selected item specified by said specifying means if the predetermined distance is continued as determined by said third condition determining means.

10. An information processing apparatus according to claim 9, further comprising a specified-item-representing-image display controlling means for displaying an image representing the selected item specified by said specifying means.

11. An information processing apparatus according to claim 9, wherein said executing means, when it is detected that the input-present-state is shifted to the input-absent-state by said input detecting means, and said coordinates detected at a time of detecting that state by said coordinates detecting means indicate the position corresponding to said selected item based on said selected item position data, does not execute the process corresponding to said selected item specified by said specifying means in a case that it is determined that being within the predetermined distance is not continued by said third condition determining means, and executes the process corresponding to said selected item specified by said specifying means in a case that it is determined that being within the predetermined distance is continued by said third condition determining means.

12. A storage medium storing an item selection processing program of an information processing apparatus provided with a display for displaying a screen including a plurality of items, a direction key for selecting and changing an item out of said plurality of items, an execution key for instructing execution of a process corresponding to the selected item by using said direction key, a pointing device for pointing a position on said screen, and a storage device storing item position data indicating position coordinates corresponding to each of said plurality of items, said item selection processing program causes a processor of said information processing apparatus to execute:

a specifying step for specifying the selected item by said direction key;

an executing step for executing a process corresponding to the selected item specified by said specifying step when said execution key is operated;

an input detecting step for detecting presence or absence of an input by said pointing device;

a start determining step for determining whether or not an input detected by said input detecting means is shifted from the input-absent-state to the input-present-state;

a coordinates detecting step for detecting coordinates of the position input by said pointing device; and a third condition determining step for determining whether or not the coordinates detected by said coordinates detecting step after the input-absent-state is shifted to the input-present-state continues to be within a predetermined distance from the coordinates detected by said coordinates detecting step when the input-absent-state is shifted to the input-present-state; wherein said specifying step specifies and changes said selected item by specifying said selected item corresponding to said coordinates detected by said coordinates detecting step on the basis of said selected item position data, said executing step, when it is detected that said input-present-state is shifted to the input-absent-state by said input detecting step, does not execute a process corresponding to said selected item specified by said specifying step if the predetermined distance is not continued as determined by said third condition determining step, and executes the process corresponding to said selected item specified by said specifying step if the predetermined distance is continued as determined by said third condition determining step.

* * * * *

UNITED STATES PATENT AND TRADEMARK OFFICE
CERTIFICATE OF CORRECTION

PATENT NO.        : 7,825,904 B2                                   Page 1 of 1
APPLICATION NO.   : 11/195850
DATED             : November 2, 2010
INVENTOR(S)       : Hino It is certified that error appears in the above-identified patent and that said Letters Patent is hereby corrected as shown below:

Column 25, line 4, delete "means" and insert --step--

Column 28, line 30, delete "means" and insert --step--

Signed and Sealed this
First Day of February, 2011

David J. Kappos
*Director of the United States Patent and Trademark Office*